US011105480B2

(12) United States Patent
Li

(10) Patent No.: US 11,105,480 B2
(45) Date of Patent: *Aug. 31, 2021

(54) ELECTRONIC LIGHTING DEVICE AND METHOD FOR MANUFACTURING SAME

(71) Applicant: L&L Candle Company, LLC, Brea, CA (US)

(72) Inventor: Xiaofeng Li, Shenzhen (CN)

(73) Assignee: L&L Candle Company, LLC, Brea, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/118,290

(22) Filed: Dec. 10, 2020

(65) Prior Publication Data

US 2021/0095827 A1  Apr. 1, 2021

Related U.S. Application Data

(63) Continuation of application No. 16/942,419, filed on Jul. 29, 2020, which is a continuation of application
(Continued)

(30) Foreign Application Priority Data

Jun. 28, 2010 (CN) .......................... 201010211402.8

(51) Int. Cl.
*F21S 10/04* (2006.01)
*F21S 6/00* (2006.01)
(Continued)

(52) U.S. Cl.
CPC ............. *F21S 10/046* (2013.01); *F21K 9/00* (2013.01); *F21S 6/001* (2013.01); *F21S 9/02* (2013.01);
(Continued)

(58) Field of Classification Search
CPC ........ F21S 10/046; F21S 10/04; F21S 10/043; F21S 6/001; F21S 9/02; F21V 9/30;
(Continued)

(56) References Cited

U.S. PATENT DOCUMENTS 782,156 A   2/1905  Meeker
817,772 A   4/1906  Helmer
(Continued)

FOREIGN PATENT DOCUMENTS

CA   2772728 C   2/2013
CN   1030823 A   2/1989
(Continued)

OTHER PUBLICATIONS

Hewlett Packard, "T-13/4 (5mm), T-1 (3mm), High Performance AlInGaP LED Lamps," Technical Data Sheet, 1998, 9 pages.
(Continued)

*Primary Examiner* — Laura K Tso
(74) *Attorney, Agent, or Firm* — Perkins Coie LLP

(57) ABSTRACT

An electronic lighting device and a method for manufacturing the same are disclosed. The electronic lighting device includes an outer shell with a first opening at a top surface and a core contained within the outer shell. The core includes a left semicircular structure and a right semicircular structure arranged to form a circular shape that is aligned with the first opening at the top surface of the outer shell. The device includes a flame component positioned partially in the internal cavity. The device also includes a light emitting element disposed at least partially in a lighting element installation cradle on a sidewall of the core to hold the light emitting element at a non-zero angle with respect to a longitudinal axis of the electronic lighting device to allow illumination of the flame component. The device
(Continued)

further includes a control circuit to control an operation of the lighting emitting element.

29 Claims, 15 Drawing Sheets

Related U.S. Application Data

No. 15/947,648, filed on Apr. 6, 2018, now Pat. No. 10,794,556, which is a continuation of application No. 15/187,640, filed on Jun. 20, 2016, now Pat. No. 10,060,585, which is a continuation of application No. 14/927,213, filed on Oct. 29, 2015, now Pat. No. 9,371,973, which is a continuation-in-part of application No. 14/588,507, filed on Jan. 2, 2015, now Pat. No. 9,366,402, which is a continuation of application No. 14/161,143, filed on Jan. 22, 2014, now Pat. No. 8,926,137, which is a continuation of application No. 13/325,754, filed on Dec. 14, 2011, now Pat. No. 8,789,986, which is a continuation-in-part of application No. PCT/CN2011/076449, filed on Jun. 27, 2011.

(51) Int. Cl.
| | |
|---|---|
| *F21V 23/00* | (2015.01) |
| *F21V 9/30* | (2018.01) |
| *F21S 9/02* | (2006.01) |
| *F21V 9/40* | (2018.01) |
| *F21V 23/04* | (2006.01) |
| *F21W 121/00* | (2006.01) |
| *H01F 7/06* | (2006.01) |
| *H05B 45/20* | (2020.01) |
| *H05B 47/16* | (2020.01) |
| *H05B 45/38* | (2020.01) |
| *H05B 47/155* | (2020.01) |
| *F21K 9/00* | (2016.01) |
| *F21Y 101/00* | (2016.01) |
| *F21Y 115/10* | (2016.01) |

(52) U.S. Cl.
CPC .............. *F21S 10/04* (2013.01); *F21S 10/043* (2013.01); *F21V 9/30* (2018.02); *F21V 9/40* (2018.02); *F21V 23/001* (2013.01); *F21V 23/009* (2013.01); *F21V 23/04* (2013.01); *F21V 23/0407* (2013.01); *H01F 7/064* (2013.01); *H05B 45/20* (2020.01); *H05B 45/38* (2020.01); *H05B 47/155* (2020.01); *H05B 47/16* (2020.01); *F21W 2121/00* (2013.01); *F21Y 2101/00* (2013.01); *F21Y 2115/10* (2016.08); *Y02B 20/40* (2013.01); *Y10S 362/81* (2013.01); *Y10T 29/4902* (2015.01); *Y10T 29/49002* (2015.01)

(58) Field of Classification Search
CPC ...... F21V 9/40; F21V 23/009; F21V 23/0407; F21W 2121/00
USPC ................................................... 362/84, 284
See application file for complete search history.

(56) References Cited

U.S. PATENT DOCUMENTS

| | | | |
|---|---|---|---|
| 1,390,389 | A | 9/1921 | Roenfeld |
| 1,507,371 | A | 9/1924 | Goodridge |
| 1,842,167 | A | 1/1932 | Hall |
| 1,955,042 | A | 4/1934 | Work |
| D102,561 | S | 10/1936 | Lamb |
| 2,435,811 | A | 2/1948 | Waters |
| 2,932,351 | A | 4/1960 | Bried |
| 2,976,450 | A | 3/1961 | Benoliel et al. |
| 2,984,032 | A | 5/1961 | Cornell |
| 3,127,539 | A | 3/1964 | Convertine |
| 3,166,863 | A | 1/1965 | Gray |
| 3,233,093 | A | 2/1966 | Gerlat |
| 3,373,274 | A | 3/1968 | Kott |
| 3,384,774 | A | 5/1968 | English |
| 3,395,475 | A | 8/1968 | Moss |
| 3,425,157 | A | 2/1969 | Hartsock |
| 3,479,561 | A | 11/1969 | Janning |
| 3,514,660 | A | 5/1970 | Kopelman |
| 3,603,013 | A | 9/1971 | Reed et al. |
| 3,639,749 | A | 2/1972 | Beckman |
| 3,681,588 | A | 8/1972 | Lee |
| 3,814,973 | A | 6/1974 | Thouret et al. |
| 3,890,085 | A | 6/1975 | Andeweg |
| 4,026,544 | A | 5/1977 | Plambeck et al. |
| 4,067,111 | A | 1/1978 | Truitt |
| 4,187,532 | A | 2/1980 | Naffier |
| 4,253,045 | A | 2/1981 | Weber |
| 4,328,534 | A | 5/1982 | Abe |
| 4,477,249 | A | 10/1984 | Ruzek et al. |
| 4,492,896 | A | 1/1985 | Jullien |
| 4,510,556 | A | 4/1985 | Johnson |
| 4,550,363 | A | 10/1985 | Sandell |
| 4,551,794 | A | 11/1985 | Sandell |
| 4,593,232 | A | 6/1986 | McEdwards |
| 4,617,614 | A | 10/1986 | Lederer |
| 4,728,871 | A | 3/1988 | Andrews |
| 4,764,853 | A | 8/1988 | Thomas et al. |
| 4,777,571 | A | 10/1988 | Morgan |
| 4,866,580 | A | 9/1989 | Blackerby |
| 4,965,707 | A | 10/1990 | Butterfield |
| 5,013,972 | A | 5/1991 | Malkieli et al. |
| 5,072,208 | A | 12/1991 | Christensen |
| 5,097,180 | A | 3/1992 | Ignon et al. |
| 5,152,602 | A | 10/1992 | Boschetto |
| 5,381,325 | A | 1/1995 | Messana |
| 5,550,452 | A | 8/1996 | Shirai et al. |
| 5,582,478 | A | 12/1996 | Ambrosino |
| 5,600,209 | A | 2/1997 | St. Louis |
| 5,707,282 | A | 1/1998 | Clements et al. |
| 5,924,784 | A | 7/1999 | Chliwnyj et al. |
| 5,927,959 | A | 7/1999 | Johnson |
| 5,936,521 | A | 8/1999 | Blackman |
| 5,998,925 | A | 12/1999 | Shimizu et al. |
| 6,066,924 | A | 5/2000 | Lederer |
| 6,198,229 | B1 | 3/2001 | Mccloud et al. |
| 6,241,362 | B1 | 6/2001 | Morrison |
| 6,257,755 | B1 | 7/2001 | Sevelle |
| 6,302,555 | B1 | 10/2001 | Bristow |
| 6,312,137 | B1 | 11/2001 | Hsieh |
| 6,454,425 | B1 | 9/2002 | Lin |
| 6,454,441 | B1 | 9/2002 | Lin |
| 6,461,011 | B1 | 10/2002 | Harrison |
| 6,491,516 | B1 | 12/2002 | Tal et al. |
| 6,511,219 | B2 | 1/2003 | Sevelle |
| 6,549,203 | B2 | 4/2003 | Randel |
| 6,599,367 | B1 | 7/2003 | Nakatsuka |
| 6,616,308 | B2 | 9/2003 | Jensen et al. |
| D486,924 | S | 2/2004 | Skradski et al. |
| 6,688,752 | B2 | 2/2004 | Moore |
| 6,712,493 | B2 | 3/2004 | Tell et al. |
| 6,719,443 | B2 | 4/2004 | Gutstein et al. |
| 6,757,487 | B2 | 6/2004 | Martin et al. |
| 6,781,270 | B2 | 8/2004 | Long |
| 6,880,958 | B2 | 4/2005 | Swarovski |
| 6,926,423 | B2 | 8/2005 | Bucher et al. |
| 6,953,401 | B2 | 10/2005 | Starr |
| 6,955,440 | B2 | 10/2005 | Niskanen |
| 6,966,665 | B2 | 11/2005 | Limburg et al. |
| 7,029,146 | B2 | 4/2006 | Kitchen |
| 7,061,488 | B2 | 6/2006 | Randel |
| 7,066,637 | B2 | 6/2006 | Nozawa et al. |
| 7,080,472 | B2 | 7/2006 | Schroeter et al. |
| 7,083,315 | B2 | 8/2006 | Hansler et al. |
| 7,093,949 | B2 | 8/2006 | Hart et al. |

(56) References Cited

U.S. PATENT DOCUMENTS

| | | |
|---|---|---|
| 7,111,421 B2 | 9/2006 | Corry et al. |
| 7,118,243 B2 | 10/2006 | Mccavit et al. |
| 7,125,142 B2 | 10/2006 | Wainwright |
| 7,159,994 B2 | 1/2007 | Schnuckle et al. |
| 7,178,939 B2 | 2/2007 | Tsai |
| 7,210,256 B2 | 5/2007 | Rosserot |
| D545,458 S | 6/2007 | Jensen |
| 7,261,455 B2 | 8/2007 | Schnuckle et al. |
| 7,300,179 B1 | 11/2007 | LaDuke et al. |
| 7,305,783 B2 | 12/2007 | Mix et al. |
| 7,332,878 B1 | 2/2008 | Smith |
| D567,993 S | 4/2008 | Shiu |
| 7,360,935 B2 | 4/2008 | Jensen et al. |
| 7,410,269 B2 | 8/2008 | Harrity et al. |
| D576,317 S | 9/2008 | Jensen |
| D589,176 S | 3/2009 | Huang et al. |
| D599,491 S | 9/2009 | Luo |
| 7,633,232 B2 | 12/2009 | Wong |
| 7,686,471 B2 | 3/2010 | Reichow |
| RE41,628 E | 9/2010 | Barbeau et al. |
| 7,824,627 B2 | 11/2010 | Michaels et al. |
| 7,828,462 B2 | 11/2010 | Jensen et al. |
| 7,837,355 B2 | 11/2010 | Schnuckle |
| 7,850,346 B1 | 12/2010 | Lauer |
| 7,969,438 B2 | 6/2011 | Xie |
| 8,070,319 B2 | 12/2011 | Schnuckle et al. |
| 8,081,872 B2 | 12/2011 | Wang |
| 8,132,936 B2 | 3/2012 | Patton et al. |
| 8,210,708 B2 | 7/2012 | Hau et al. |
| 8,217,940 B2 | 7/2012 | Burley |
| 8,235,558 B1 | 8/2012 | Lauer |
| 8,282,251 B2 | 8/2012 | Fournier |
| 8,256,935 B1 | 9/2012 | Cullimore et al. |
| 8,342,712 B2 | 1/2013 | Patton et al. |
| 8,371,740 B2 | 2/2013 | Pestl |
| 8,408,746 B1 | 4/2013 | Lauer |
| 8,454,190 B2 | 6/2013 | Hau et al. |
| 8,496,345 B2 | 7/2013 | Chan |
| 8,534,869 B2 | 9/2013 | Patton et al. |
| 8,550,660 B2 | 10/2013 | Patton et al. |
| 8,562,186 B2 | 10/2013 | Gutstein |
| 8,646,946 B2 | 2/2014 | Schnuckle et al. |
| 8,662,698 B2 | 3/2014 | Sagna |
| 8,696,166 B2 | 4/2014 | Patton et al. |
| 8,721,118 B2 | 5/2014 | Patton et al. |
| 8,724,975 B2 | 5/2014 | Browder |
| 8,727,569 B2 | 5/2014 | Schnuckle et al. |
| 8,789,986 B2 | 7/2014 | Li |
| 8,858,043 B2 | 10/2014 | Gutstein |
| 8,894,261 B2 | 11/2014 | Chen |
| 8,926,137 B2 | 1/2015 | Li |
| 8,998,461 B2 | 4/2015 | Gutstein et al. |
| 9,033,553 B2 | 5/2015 | Li |
| 9,052,078 B2 | 6/2015 | Sheng |
| 9,068,706 B2 | 6/2015 | Fournier |
| D739,573 S | 9/2015 | Li |
| D740,460 S | 10/2015 | Thompson et al. |
| 9,163,798 B2 | 10/2015 | Chartreand |
| D743,096 S | 11/2015 | Patton et al. |
| D748,322 S | 1/2016 | Patton et al. |
| D748,843 S | 2/2016 | Thompson et al. |
| 9,267,654 B1 | 2/2016 | Lloret |
| D752,276 S | 3/2016 | Thompson et al. |
| 9,322,522 B2 | 4/2016 | Hau |
| 9,322,523 B2 | 4/2016 | Patton et al. |
| 9,335,014 B2 | 5/2016 | Patton et al. |
| 9,341,342 B2 | 5/2016 | Chiang |
| 9,360,181 B2 | 6/2016 | Li |
| 9,366,402 B2 | 6/2016 | Li |
| 9,371,972 B2 | 6/2016 | Li |
| 9,371,973 B2 | 6/2016 | Li |
| 9,447,937 B2 | 9/2016 | Fournier |
| 9,447,938 B2 | 9/2016 | Li |
| 9,491,832 B2 | 11/2016 | Gutstein |
| 9,512,971 B2 | 12/2016 | Li |
| 9,523,471 B2 | 12/2016 | Li |
| 9,541,247 B2 | 1/2017 | Patton |
| 9,551,470 B2 | 1/2017 | Li |
| D779,707 S | 2/2017 | Thompson et al. |
| 9,572,236 B2 | 2/2017 | Patton |
| D781,488 S | 3/2017 | Patton |
| 9,591,729 B2 | 3/2017 | Patton |
| 9,605,824 B1 | 3/2017 | Li |
| 9,625,112 B2 | 4/2017 | Li |
| 9,664,349 B1 | 5/2017 | Hurduc |
| 9,709,231 B2 * | 7/2017 | Li .................... H05B 45/37 |
| 9,739,432 B2 | 8/2017 | Li |
| 9,765,955 B2 | 9/2017 | Liu |
| 9,810,388 B1 | 11/2017 | Li |
| 9,841,156 B2 | 12/2017 | Ding |
| 9,860,953 B2 | 1/2018 | Li |
| 9,869,439 B2 | 1/2018 | Li |
| 9,874,340 B2 | 1/2018 | Chien |
| 9,897,270 B2 | 2/2018 | Wu |
| 10,024,507 B2 | 7/2018 | Fournier et al. |
| 10,036,521 B2 | 7/2018 | Gutstein et al. |
| 10,060,585 B2 | 8/2018 | Li |
| 10,111,307 B2 | 10/2018 | Li |
| 10,132,454 B2 | 11/2018 | Li |
| 10,178,731 B2 | 1/2019 | Patton et al. |
| 10,197,235 B2 | 2/2019 | Bentley et al. |
| 10,232,074 B2 | 3/2019 | Li |
| 10,247,374 B2 | 4/2019 | Gutstein et al. |
| 10,352,515 B1 | 7/2019 | Yin |
| 10,352,517 B2 | 7/2019 | Carpintero et al. |
| 10,408,401 B2 | 9/2019 | Ding |
| 10,415,778 B1 | 9/2019 | Li |
| 10,506,679 B2 | 12/2019 | Wu |
| 10,520,148 B2 | 12/2019 | Li |
| 10,533,718 B2 | 1/2020 | Li |
| 10,533,719 B2 | 1/2020 | Schnuckle et al. |
| 10,533,720 B2 | 1/2020 | Li |
| 10,539,283 B2 | 1/2020 | Li |
| 10,794,556 B2 | 1/2020 | Li |
| 10,578,264 B2 | 3/2020 | Carpintero |
| 10,648,631 B2 | 5/2020 | Li |
| 2001/0033488 A1 | 10/2001 | Chliwnyj et al. |
| 2002/0080601 A1 | 6/2002 | Meltzer |
| 2002/0080801 A1 | 6/2002 | Derks |
| 2002/0093834 A1 | 7/2002 | Yu et al. |
| 2002/0152655 A1 | 10/2002 | Merrill et al. |
| 2003/0031009 A1 | 2/2003 | Fan |
| 2003/0041491 A1 | 3/2003 | Mix |
| 2003/0053305 A1 | 3/2003 | Lin |
| 2003/0072154 A1 | 4/2003 | Moore |
| 2004/0037069 A1 | 2/2004 | Blackbourn |
| 2004/0060213 A1 | 4/2004 | Schroeter et al. |
| 2004/0114351 A1 | 6/2004 | Stokes et al. |
| 2004/0141315 A1 | 7/2004 | Sherburne |
| 2004/0165374 A1 | 8/2004 | Robinson |
| 2004/0223326 A1 | 11/2004 | Wainwright |
| 2005/0007779 A1 | 1/2005 | Nozawa et al. |
| 2005/0047127 A1 | 3/2005 | Tutman |
| 2005/0097792 A1 | 5/2005 | Naden |
| 2005/0169666 A1 | 8/2005 | Porchia |
| 2005/0169812 A1 | 8/2005 | Helf et al. |
| 2005/0196716 A1 | 9/2005 | Haab et al. |
| 2005/0207171 A1 | 9/2005 | McCavit |
| 2005/0225984 A1 | 10/2005 | Theobald |
| 2005/0254248 A1 | 11/2005 | Lederer |
| 2005/0285538 A1 | 12/2005 | Jaworski et al. |
| 2006/0023443 A1 | 2/2006 | Connelly |
| 2006/0034079 A1 | 2/2006 | Schnuckle et al. |
| 2006/0034100 A1 | 2/2006 | Schnuckle et al. |
| 2006/0099565 A1 | 5/2006 | Rosserot |
| 2006/0101681 A1 | 5/2006 | Hess et al. |
| 2006/0120080 A1 | 6/2006 | Sipinski et al. |
| 2006/0146544 A1 | 7/2006 | Leung |
| 2006/0192503 A1 | 8/2006 | Trombetta et al. |
| 2006/0209067 A1 | 9/2006 | Pellacini |
| 2006/0232958 A1 | 10/2006 | Chang |
| 2006/0263733 A1 | 11/2006 | Furner et al. |
| 2007/0002560 A1 | 1/2007 | Gutstein et al. |
| 2007/0014107 A1 | 1/2007 | Mishan |

(56) References Cited

U.S. PATENT DOCUMENTS

| | | |
|---|---|---|
| 2007/0020572 A1 | 1/2007 | Furner |
| 2007/0020573 A1 | 1/2007 | Furner |
| 2007/0053174 A1 | 3/2007 | Lin |
| 2007/0053181 A1 | 3/2007 | Urkumyan |
| 2007/0125367 A1 | 6/2007 | Lim |
| 2007/0127249 A1 | 6/2007 | Medley et al. |
| 2007/0154857 A1 | 7/2007 | Cho |
| 2007/0159422 A1 | 7/2007 | Blandino et al. |
| 2007/0176926 A1 | 8/2007 | Garcia |
| 2007/0177394 A1 | 8/2007 | Vock |
| 2007/0223217 A1 | 9/2007 | Hsu |
| 2007/0236947 A1 | 10/2007 | Jensen et al. |
| 2007/0242259 A1 | 10/2007 | Kawakami et al. |
| 2007/0291470 A1 | 12/2007 | Thomson |
| 2007/0294270 A1 | 12/2007 | Gregory |
| 2008/0031784 A1 | 2/2008 | Bistritzky |
| 2008/0074867 A1 | 3/2008 | Chen |
| 2008/0074875 A1 | 3/2008 | Jensen et al. |
| 2008/0094825 A1 | 4/2008 | Silver |
| 2008/0112154 A1 | 5/2008 | Reichow |
| 2008/0117634 A1 | 5/2008 | Wong |
| 2008/0129226 A1 | 6/2008 | Dewitt et al. |
| 2008/0130266 A1 | 6/2008 | Dewitt et al. |
| 2008/0151563 A1 | 6/2008 | Chen |
| 2008/0151571 A1 | 6/2008 | Chen |
| 2008/0158863 A1 | 7/2008 | Tsai |
| 2008/0231210 A1 | 9/2008 | Schwenk |
| 2008/0310149 A1 | 12/2008 | Chan |
| 2008/0315005 A1 | 12/2008 | Michaels |
| 2009/0027391 A1 | 1/2009 | Burley |
| 2009/0059596 A1 | 3/2009 | Lederer |
| 2009/0126241 A1 | 5/2009 | Asofsky |
| 2009/0135586 A1 | 5/2009 | Yang |
| 2009/0213597 A1 | 8/2009 | Nelkin |
| 2009/0256496 A1 | 10/2009 | Swarovski |
| 2009/0313866 A1 | 12/2009 | Wang |
| 2010/0001662 A1 | 1/2010 | Nelkin et al. |
| 2010/0001682 A1 | 1/2010 | Dickson et al. |
| 2010/0079999 A1 | 4/2010 | Schnuckle |
| 2010/0124050 A1 | 5/2010 | Hau et al. |
| 2010/0134022 A1 | 6/2010 | Gutstein et al. |
| 2010/0207538 A1 | 8/2010 | Chen |
| 2010/0253247 A1 | 10/2010 | Shu |
| 2010/0254155 A1 | 10/2010 | Capo |
| 2011/0000666 A1 | 1/2011 | Couto |
| 2011/0019422 A1 | 1/2011 | Schnuckle et al. |
| 2011/0058363 A1 | 3/2011 | Fattizzi |
| 2011/0110073 A1 | 5/2011 | Schnuckle et al. |
| 2011/0127914 A1 | 6/2011 | Patton et al. |
| 2011/0195787 A1 | 8/2011 | Wells |
| 2011/0204828 A1 | 8/2011 | Moody et al. |
| 2011/0255272 A1 | 10/2011 | Privas |
| 2011/0317403 A1 | 12/2011 | Fournier et al. |
| 2012/0049765 A1 | 3/2012 | Lu et al. |
| 2012/0093491 A1 | 4/2012 | Browder et al. |
| 2012/0134157 A1 | 5/2012 | Li |
| 2013/0050985 A1 | 2/2013 | Kwok et al. |
| 2013/0088137 A1 | 4/2013 | Edgarius |
| 2013/0100686 A1 | 4/2013 | Patton |
| 2013/0147391 A1 | 6/2013 | Patton et al. |
| 2013/0148353 A1 | 6/2013 | Patton |
| 2013/0163249 A1 | 6/2013 | Miura |
| 2013/0223043 A1 | 8/2013 | Ray |
| 2013/0242579 A1 | 9/2013 | Patton |
| 2013/0265748 A1 | 10/2013 | Hau et al. |
| 2013/0335971 A1 | 12/2013 | Patton |
| 2014/0009948 A1 | 1/2014 | Schnuckle |
| 2014/0035483 A1 | 2/2014 | Becker et al. |
| 2014/0140042 A1 | 5/2014 | Schreiber |
| 2014/0177212 A1 | 6/2014 | Li |
| 2014/0211471 A1 | 7/2014 | Gaumann |
| 2014/0211499 A1 | 7/2014 | Fong et al. |
| 2014/0218903 A1 | 8/2014 | Sheng |
| 2014/0241004 A1 | 8/2014 | Chen |
| 2014/0254148 A1 | 9/2014 | Fournier |
| 2014/0268652 A1 | 9/2014 | Li |
| 2014/0268704 A1 | 9/2014 | Yang |
| 2014/0274212 A1 | 9/2014 | Zurek et al. |
| 2014/0286024 A1 | 9/2014 | Li |
| 2014/0313694 A1 | 10/2014 | Patton et al. |
| 2014/0340881 A1 | 11/2014 | Tsai |
| 2014/0362592 A1 | 12/2014 | Lee |
| 2015/0008845 A1 | 1/2015 | Kim et al. |
| 2015/0036348 A1 | 2/2015 | Dong |
| 2015/0070874 A1 | 3/2015 | Beesley et al. |
| 2015/0109786 A1 | 4/2015 | Li |
| 2015/0124442 A1 | 5/2015 | Ding |
| 2015/0204530 A1 | 7/2015 | Lee |
| 2015/0233538 A1 | 8/2015 | Sheng |
| 2015/0292698 A1 | 10/2015 | Schnuckle et al. |
| 2015/0308643 A1 | 10/2015 | Huang |
| 2015/0369431 A1 | 12/2015 | Li |
| 2015/0369432 A1 | 12/2015 | Li |
| 2015/0373815 A1 | 12/2015 | Patton |
| 2016/0040844 A1 | 2/2016 | Patton et al. |
| 2016/0047517 A1 | 2/2016 | Li |
| 2016/0057829 A1 | 2/2016 | Li |
| 2016/0109081 A1 | 4/2016 | Thompson et al. |
| 2016/0109082 A1 | 4/2016 | Li |
| 2016/0109083 A1 | 4/2016 | Li |
| 2016/0163630 A1 | 6/2016 | Kummerl |
| 2016/0186947 A1 | 6/2016 | Li |
| 2016/0258584 A1 | 9/2016 | Li |
| 2016/0290580 A1 | 10/2016 | Li |
| 2016/0298816 A1 | 10/2016 | Fang |
| 2016/0348864 A1 | 12/2016 | Li |
| 2016/0356442 A1 | 12/2016 | Garcia |
| 2017/0067606 A1 | 3/2017 | Hau et al. |
| 2017/0082256 A1 | 3/2017 | Li |
| 2017/0130918 A1 | 5/2017 | Li |
| 2017/0159900 A1 | 6/2017 | Gerson |
| 2017/0307223 A1 | 10/2017 | Li |
| 2018/0065146 A1 | 3/2018 | Liu |
| 2018/0180236 A1 | 6/2018 | Li |
| 2018/0254441 A1 | 9/2018 | Li |
| 2019/0032877 A1 | 1/2019 | Chen |
| 2019/0063703 A1 | 2/2019 | Hurduc |
| 2019/0072251 A1 | 3/2019 | Carpintero et al. |
| 2019/0195447 A1 | 6/2019 | Wu |
| 2019/0293251 A1 | 9/2019 | Li |
| 2019/0301693 A1 | 10/2019 | Li |
| 2019/0301694 A1 | 10/2019 | Li |
| 2019/0316748 A1 | 10/2019 | Li |
| 2019/0323670 A1 | 10/2019 | Carpintero |
| 2019/0346102 A1 | 11/2019 | Li |
| 2020/0018456 A1 | 1/2020 | Li |

FOREIGN PATENT DOCUMENTS

| | | |
|---|---|---|
| CN | 2483103 Y | 3/2002 |
| CN | 2551859 Y | 5/2003 |
| CN | 2562059 Y | 7/2003 |
| CN | 1530142 A | 9/2004 |
| CN | 1646177 A | 7/2005 |
| CN | 2755407 Y | 2/2006 |
| CN | 2854329 Y | 1/2007 |
| CN | 2888274 Y | 4/2007 |
| CN | 2906310 Y | 5/2007 |
| CN | 2924266 Y | 7/2007 |
| CN | 200940808 Y | 8/2007 |
| CN | 201011621 Y | 1/2008 |
| CN | 201059432 Y | 5/2008 |
| CN | 201093300 | 7/2008 |
| CN | 201103952 Y | 8/2008 |
| CN | 201159425 Y | 12/2008 |
| CN | 201235095 Y | 5/2009 |
| CN | 201418887 Y | 3/2010 |
| CN | 201475662 U | 5/2010 |
| CN | 101408284 B | 6/2010 |
| CN | 201533921 U | 7/2010 |
| CN | 101865413 A | 10/2010 |
| CN | 201643048 U | 11/2010 |
| CN | 101918755 B | 12/2010 |
| CN | 102147095 A | 8/2011 |

(56) References Cited

FOREIGN PATENT DOCUMENTS

| | | |
|---|---|---|
| CN | 102563510 A | 7/2012 |
| CN | 101865413 B | 8/2012 |
| CN | 102734740 A | 10/2012 |
| CN | 102748589 A | 10/2012 |
| CN | 202708962 U | 1/2013 |
| CN | 202791780 U | 3/2013 |
| CN | 103047604 A | 4/2013 |
| CN | 203115827 U | 8/2013 |
| CN | 203131550 U | 8/2013 |
| CN | 103322500 A | 9/2013 |
| CN | 20329818 U | 11/2013 |
| CN | 203273669 U | 11/2013 |
| CN | 203273670 U | 11/2013 |
| CN | 103471028 B | 12/2013 |
| CN | 203431703 U | 2/2014 |
| CN | 203442498 U | 2/2014 |
| CN | 103615698 A | 3/2014 |
| CN | 103615699 A | 3/2014 |
| CN | 103615700 A | 3/2014 |
| CN | 203464042 U | 3/2014 |
| CN | 203478092 U | 3/2014 |
| CN | 203517611 U | 4/2014 |
| CN | 203571618 U | 4/2014 |
| CN | 203595070 U | 5/2014 |
| CN | 104048246 B | 9/2014 |
| CN | 203810268 U | 9/2014 |
| CN | 203836842 U | 9/2014 |
| CN | 104089241 A | 10/2014 |
| CN | 203940346 U | 11/2014 |
| CN | 204005708 U | 12/2014 |
| CN | 204062832 U | 12/2014 |
| CN | 204114827 U | 1/2015 |
| CN | 204114828 U | 1/2015 |
| CN | 204268356 U | 4/2015 |
| CN | 103047604 B | 10/2015 |
| DE | 1489617 A1 | 5/1969 |
| DE | 202005001220 U1 | 12/2005 |
| DE | 202009018453 U1 | 9/2011 |
| DE | 212011100014 U1 | 4/2012 |
| DE | 102012206988 A1 | 10/2013 |
| DE | 202013105563 U1 | 1/2014 |
| DE | 202014100821 U1 | 4/2014 |
| DE | 202013012047 U1 | 4/2015 |
| DE | 202015000490 U1 | 4/2015 |
| DE | 202015102274 U1 | 6/2015 |
| EP | 0138786 A1 | 4/1985 |
| EP | 0855189 A2 | 7/1998 |
| EP | 1111296 A2 | 6/2001 |
| EP | 1708761 | 8/2005 |
| EP | 1729827 | 8/2005 |
| EP | 1639291 B1 | 3/2006 |
| EP | 1738105 A1 | 1/2007 |
| EP | 1838110 A1 | 9/2007 |
| EP | 1878449 A1 | 1/2008 |
| EP | 1914471 A2 | 4/2008 |
| EP | 1971802 A2 | 9/2008 |
| EP | 2010816 A1 | 1/2009 |
| EP | 1995511 B1 | 9/2009 |
| EP | 1977163 B1 | 2/2011 |
| EP | 2290290 A1 | 3/2011 |
| EP | 2261552 B1 | 11/2012 |
| EP | 2614293 A1 | 1/2013 |
| EP | 2735213 A1 | 1/2013 |
| EP | 2232128 B1 | 2/2013 |
| EP | 2570714 A1 | 3/2013 |
| EP | 2454521 B1 | 5/2013 |
| EP | 2587127 A1 | 5/2013 |
| EP | 2715223 B1 | 4/2014 |
| EP | 2724079 B1 | 4/2014 |
| EP | 2110598 B1 | 2/2015 |
| EP | 2840303 A1 | 2/2015 |
| EP | 2899452 A1 | 7/2015 |
| EP | 2290290 B1 | 12/2015 |
| EP | 2952802 B1 | 12/2015 |
| EP | 2984401 B1 | 2/2016 |
| EP | 3096075 B1 | 11/2016 |
| EP | 3150904 A1 | 4/2017 |
| EP | 3403022 A1 | 7/2017 |
| ES | 2404840 | 5/2013 |
| FR | 1304083 | 9/1962 |
| GB | 499745 A | 1/1939 |
| GB | 2230335 B | 10/1990 |
| GB | 2267746 A | 12/1993 |
| GB | 2323159 A | 9/1998 |
| GB | 2353352 A | 2/2001 |
| GB | 2379731 A | 3/2003 |
| GB | 2385413 B | 10/2005 |
| GB | 2434441 A | 7/2007 |
| GB | 2443926 A | 5/2008 |
| GB | 2455598 A | 6/2009 |
| GB | 2527626 B | 12/2015 |
| JP | H0652709 A | 2/1994 |
| JP | H1057464 A | 3/1998 |
| JP | 2000284730 | 10/2000 |
| JP | 2008180755 A | 8/2008 |
| JP | 5399499 B2 | 1/2014 |
| JP | 2014038865 A | 2/2014 |
| KR | 101174246 B1 | 8/2012 |
| SE | 528742 C2 | 2/2007 |
| WO | WO198202756 A1 | 8/1982 |
| WO | WO198503561 A1 | 8/1985 |
| WO | WO198704506 A1 | 7/1987 |
| WO | WO1996025624 A1 | 8/1996 |
| WO | WO200104543 A1 | 1/2001 |
| WO | WO2001092780 A1 | 12/2001 |
| WO | WO2003011349 A1 | 2/2003 |
| WO | WO2003071183 A1 | 8/2003 |
| WO | WO2005074998 A1 | 8/2005 |
| WO | WO2005074999 A1 | 8/2005 |
| WO | WO2005108855 A1 | 11/2005 |
| WO | WO2006020839 A2 | 2/2006 |
| WO | WO2006130410 A2 | 12/2006 |
| WO | WO2007002560 A1 | 1/2007 |
| WO | WO2007075613 A2 | 7/2007 |
| WO | WO2007120540 A1 | 10/2007 |
| WO | WO2008060800 A2 | 5/2008 |
| WO | WO2008076326 A2 | 6/2008 |
| WO | WO2008092753 A2 | 8/2008 |
| WO | WO20080092753 | 8/2008 |
| WO | WO2010009575 A1 | 1/2010 |
| WO | WO2012000418 A1 | 1/2012 |
| WO | WO2012099718 A1 | 7/2012 |
| WO | WO2012100325 A1 | 8/2012 |
| WO | WO2012162538 A1 | 11/2012 |
| WO | WO2013003936 A1 | 1/2013 |
| WO | WO2013010250 A1 | 1/2013 |
| WO | WO2013020263 A2 | 2/2013 |
| WO | WO2013020439 A1 | 2/2013 |
| WO | WO2014139483 A1 | 9/2014 |
| WO | WO2016000517 A1 | 1/2016 |
| WO | WO2017122094 A1 | 7/2017 |
| WO | WO2018104788 A1 | 6/2018 |

OTHER PUBLICATIONS

"Candle Impressions Receives LED Patent for Mirage Line," downloaded Jun. 9, 2020 from https://www.giftsanddec.com/busniess-news/candle-impressions-receives-led-patent-mirage-line/ , 3 pages.

Blumenfeld, C., "Candella Flameless *Realistic* Candles," published Jan. 11, 2010 from https://www.youtube.com/watchZv=_C\H1ByYrz4, 3 pages.

"D&M Innoventions: A New Kind of Haunted Mansion," published Feb. 13, 2010 from https://disneyandmore.blogspot.com/2010/02/d-innoventions-new-kind-ofhaunted.html, 52 pages.

Wasserman, G., "Candella, LLC Lights Up 2010 Consumer Electronics Show with "Imagineered" Candle Flame Illusion," published Jan. 8, 2010 from https://www.prweb.com/releases/2010ces/01/prweb3424584.htm, 4 pages.

Norman, J., "Bright future with Disney fake candles," published Feb. 19, 2010 from https://www.ocregister.com/2010/02/19/bright-future-with-disney-fake-candles/, 4 pages.

(56) References Cited

OTHER PUBLICATIONS

"Candella Flameless Candles: Don't Blow on Them!," Mommies With Style, published Jan. 14, 2010 from www.mommieswithstyle.com/candella-flameless-candles-dont-blow-on-them/, 8 pages.
"Mr. Gadget CES 2010—Candella," published Jan. 13, 2010 from http://www.youtube.com/watch?v=1AFb6Wx9Jbo, 5 pages.
"Candella, LLC Lights 2010 Consumer Electronics Show With . . . " PrWeb, Google Image Result for https://ww1.prweb.com/prfiles/2010/01/07/1387894/img0748.jpg, published Jan. 7, 2010, 1 page.
U.S. Appl. No. 60/951,450, filed Jul. 23, 2007, 38 pages.
U.S. Appl. No. 61/101,611, filed Sep. 30, 2008, 31 pages.
U.S. Appl. No. 61/293,516, filed Jan. 8, 2010, 17 pages.
U.S. Appl. No. 62/555,154, filed Sep. 7, 2017, 15 pages.
*Candella, LLC* v. *Liown Electronics Co. Ltd., et al.*, Case No. 12-cv-02803(PJS/JJK), in the United States District Court of Minnesota, "The Liown Defendants' Prior Art Statement,"; filed Nov. 26, 2014; 18 pages.
*Candella, LLC et al.* v. *Liown Electronics Co. Ltd., et al.*, Case No. 14-cv-3103-SRN-FLN, in the United States District Court of Minnesota, Plaintiffs' Memorandum of Law in Support of Motion for Preliminary Injunction, filed Nov. 26, 2014, 45 pages.
*Shenzhen Liown Electronics Co., Ltd.,* v. *Luminara Worldwide, LLC et al.*, Case No. 14-cv-3112 SRN-FLN, in the United Strict Court of Minnesota, Declaration of Paul J. Robbennolt in Support of Plaintiff's Motion for Preliminary Injunction, filed Mar. 27, 2015; 2 pages.
*Luminara Worldwide, LLC* v. *Liown Electronics Co. Ltd., et al.*, Case No. 14-cv-3103-SRN-FLN, in the United States District Court of Minnesota, and *Shenzhen Liown Electronics Co., Ltd.* v. *Luminara Worldwide, LLC et al.*, Case No. 14-cv-03112-SRN-FLN in the United States of District Court of Minnesota, "Luminara's Prior Art Statement Regarding U.S. Pat. No. 8,789,986 and U.S. Pat. No. 8,926,137," filed Mar. 27, 2015; 92 pages.
*Luminara Worldwide, LLC* v. *Liown Electronics Co. Ltd., et al.*, Case No. 14-cv-3103-SRN-FLN, in the United States District Court of Minnesota, "Plaintiff's Memorandum of Law Concerning Claim Construction," filed Aug. 17, 2015; 36 pages.
*Luminara Worldwide, LLC* v. *Liown Electronics Co. Ltd., et al.*, Case No. 14-cv-3103-SRN-FLN, in the United States District Court of Minnesota, "Defendants' Opening Claim Construction Brief," filed Aug. 17, 2015; 40 pages.
*Luminara Worldwide, LLC* v. *Liown Electronics Co. Ltd., et al.*, Case No. 14-cv-3103-SRN-FLN, in the United States District Court of Minnesota, Declaration of Courtland C. Merrill in Support of Plaintiff's Memorandum of Law Concerning Claim Construction, filed Aug. 17, 2015, 260 pages.
*Luminara Worldwide, LLC* v. *Liown Electronics Co. Ltd., et al.*, Case No. 14-cv-3103-SRN-FLN, in the United States District Court of Minnesota, Exhibit 9, filed Nov. 26, 2014, 22 pages.
*Luminara Worldwide, LLC* v. *Liown Electronics Co. Ltd., et al.*, Case No. 14-cv-3103-SRN-FLN, in the United States District Court of Minnesota, Exhibit 27, filed Nov. 26, 2014, 12 pages.
*Candella, LLC et al.* v. *Liown Electronics Co. Ltd., et al.*, Case No. 14-cv-3103-SRN-FLN, in the United States District Court of Minnesota, Second Amended Complaint; filed Dec. 9, 2014, 190 pages.
*Candella, LLC et al.* v. *Liown Electronics Co. Ltd., et al.*, Case No. 14-cv-3103-SRN-FLN, in the United States District Court of Minnesota, Plaintiffs' Memorandum of Law in Support of Motion for Leave to File Second Amended Complaint; filed Dec. 9, 2014, 22 pages.
Complaint of L&L Candle Company LLC and Sotera Tschetter, Inc. Under Section 337 of the Tariff Act of 1930, in the United State International Trade Commission, Inv. No. 337-Ta-____, filed Mar. 2, 2020; 82 pages.
Decorware International Inc.'s Response to Complaint and Notice of Investigation in Inv. No. 337-TA-1195 before the United States International Trade Commission, filed May 11, 2020, 55 pages.
Gerson Company's Response to Complaint and Notice of Investigation in Inv. No. 337-TA-1195 before the United States International Trade Commission, filed May 18, 2020, 105 pages.
Gerson International (H.K.), Ltd. Response to Complaint and Notice of Investigation in Inv. No. 337-TA-1195 before the United States International Trade Commission, filed May 18, 2020, 105 pages.
Lifetime Brands, Inc. Response to Complaint and Notice of Investigation in Inv. No. 337-TA-1195 before the United States International Trade Commission, filed May 11, 2020, 50 pages.
Merchsource, LLC Response to Complaint and Notice of Investigation in Inv. No. 337-TA-1195 before the United States International Trade Commission, filed May 11, 2020, 60 pages.
Nantong Ya Tai Candle Arts & Crafts Co.'s Response to Complaint and Notice of Investigation in Inv. No. 337-TA-1195 before the United States International Trade Commission, filed May 11, 2020, 48 pages.
Scott Brothers Entertainment, Inc.'s Response to Complaint and Notice of Investigation in Inv. No. 337-TA-1195 before the United States International Trade Commission, filed May 11, 2020, 51 pages.
Yiwu Shengda Art Co., Ltd. And Ningbo Shanhuang Electric Appliance Co., Ltd. Response to Complaint and Notice of Investigation in Inv. No. 337-TA-1195 before the United States International Trade Commission, filed May 11, 2020, 55 pages.
Complainants' Initial Markman Brief in Inv. No. 337-TA-1195 before the United States International Trade Commission, filed Jul. 28, 2020, 57 pages.
Complainants' Rebuttal Markman Brief in Inv. No. 337-TA-1195 before the United States International Trade Commission, filed Aug. 11, 2020, 34 pages.
Complainants' Rebuttal Markman Brief (Revised) in Inv. No. 337-TA-1195 before the United States International Trade Commission, filed Aug. 25, 2020, 34 pages.
Markman Order No. 24 in Inv. No. 337-TA-1195 before the United States International Trade Commission, issued Sep. 14, 2020, 71 pages.
Respondents' Initial Markman Brief in Inv. No. 337-TA-1195 before the United States International Trade Commission, filed Jul. 28, 2020, 60 pages.
Respondents' Rebuttal Markman Brief in Inv. No. 337-TA-1195 before the United States International Trade Commission, filed Aug. 11, 2020, 34 pages.
Complainants' Response to Motion of Respondents Sterno Home, Inc., Ningbo Huamao International Trading Co., Ltd. and Ningbo Langsheng Artware Co., Ltd. For Summary Determination Under 19 C.F.R. § 210.18 for Invalidity Due to Lack of a Written Description Under 35 U.S.C. § 112 in Inv. No. 337-TA-1195 before the United States International Trade Commission, filed Aug. 11, 2020, 67 pages.
Respondent Decorware International Inc.'s Response to Motion of Sterno Home, Inc., Ningbo Huamao International Trading Co., Ltd. and Ningbo Langsheng Artware Co., Ltd. For Summary Determination Under 19 C.F.R. § 210.18 for Invalidity Due to Lack of a Written Description Under 35 U.S.C. § 112 in Inv. No. 337-TA-1195 before the United States International Trade Commission, filed Jun. 22, 2020, 4 pages.
Respondents Lifetime Brands, Inc. and Scott Brothers Entertainment Inc.'S Response to Motion of Sterno Home, Inc., Ningbo Huamo International Trading Co., Ltd., and Ningbo Langsheng Artware Co., Ltd. For Summary Determination Under 19 C.F.R. § 210.18 for Invalidity Due to Lack of Written Description Under 35 U.S.C. § 112 in Inv. No. 337-TA-1195 before the United States International Trade Commission, filed Jun. 22, 2020, 5 pages.
Order No. 25 Denying the Sterno Respondents' Motion for Summary Determination of Invalidity Due to Lack of Written Description in Inv. No. 337-TA-1195 before the United States International Trade Commission, issued Sep. 14, 2020, 8 pages.
Commission Investigative Staff's Response to the Motion of Serno Home, Inc., Ningbo Huamao International Trading Co., Ltd. and Ningbo Langsheng Artware Co., Ltd. For Summary Determination Under 19 C.F.R. § 210.18 for Invalidity Due to Lack of a Written

(56) References Cited

OTHER PUBLICATIONS

Description Under 35 U.S.C. § 112 in Inv. No. 337-TA-1195 before the United States International Trade Commission, issued Jun. 22, 2020, 21 pages.

Memorandum of Points & Authorities in Support of Motion of Sterno Home, Inc., Ningbo Huamao International Trading Co., Ltd. and Ningbo Langsheng Artware Co., Ltd. For Summary Determination Under 19 C.F.R. § 210.18 for Invalidity Due to Lack of a Written Description Under 35 U.S.C. § 112 in Inv. No. 337-TA-1195 before the United States International Trade Commission, issued Jun. 3, 2020, 56 pages.

Motion of Respondents Sterno Home, Inc., Ningbo Huamao International Trading Co., Ltd. and Ningbo Langsheng Artware Co., Ltd. For Summary Determination Under 19 C.F.R. § 210.18 for Invalidity Due to Lack of a Written Description Under 35 U.S.C. § 112 in Inv. No. 337-TA-1195 before the United States International Trade Commission, issued Jun. 3, 2020, 6 pages.

Reply to Motion for Summary Determination That the Claims Lack Statutory Written Description in Inv. No. 337-TA-1195 before the United States International Trade Commission, issued Jun. 29, 2020, 32 pages.

Deposition of Stuart B. Brown, Ph.D., Case No. IPR2015-01656, Case No. IPR2015-01657 and Case No. IPR2015-01658 before the U.S. Patent and Trademark Office, taken Jul. 13, 2016, 66 pages.

*Luminara Worldwide, LLC v. Liown Electronics Ltd., et al.*, Case No. 0:15-cv-03028-SRN-FLN, in the United States District Court of Minnesota, Defendants' Amended Answer, Defenses, and Counterclaims to Plaintiff Luminara Worldwide, LLC's Second Amended Complaint, filed Aug. 25, 2016; 47 pages.

Canadian Examination and Search Report for CA2936224, dated Sep. 30, 2016, 5 pages.

Canadian Examination and Search Report for CA2936225, dated Sep. 29, 2016, 5 pages.

Canadian Examination Report for CA2930099, dated Jan. 5, 2017 from the Canadian Intellectual Property Office, 3 pages.

Chip: Progimax Candle, http://beste-apss.chip.de/android/app/kostenloses-candle-kerzen-app-fuer-- den-androiden.com.progimax.candle.free/ , archived on http://www.archive.org on Dec. 30, 2013 [accessed on Mar. 2, 2017].

Definition of "Electromagnet" in the Encarta World English Dictionary, Aug. 1999.

Engineer's Handbook (Epoxy definition), http://engineershandbook.com/Materials/epoxy.htm, Jul. 18, 2013.

EP Search Report for European Patent Application No. 12185984.7 dated Dec. 14, 2012.

Final Office Action for U.S. Appl. No. 12/273,337 dated Jan. 18, 2012, 17 pages.

Final Office Action for U.S. Appl. No. 13/098,571 dated Sep. 30, 2014, 18 pages.

Final Office Action for U.S. Appl. No. 13/908,571 dated Mar. 18, 2014, 20 pages.

Final Office Action for U.S. Appl. No. 14/925,893, dated Apr. 26, 2016, 29 pages.

International Search Report and Written Opinion for PCT Application No. PCT/CN/2014/073557 dated Jul. 2, 2014.

International Search Report for PCT Application No. PCT/US2009/054401 dated Oct. 26, 2009.

International Search Report for PCT/CN2014/091362, dated Apr. 3, 2015, 2 pages.

Lab M3: The Physical Pendulum, Physics 1140—Experimental Physics, Course Laboratory Instructions, 2000.

MiPow Playbulb Candle, Android, http://www.mipow.de/smart-home/29/mipow-playbulb-candle, archived on http://www.archive.org on May 14, 2016 [accessed Mar. 2, 2017].

Nagashima, H. et al., "Introduction to Chaos, Physics and Mathematics of Chaotic Phenomena," Institute of Physics Publishing, 1999.

Non-Final Office Action for U.S. Appl. No. 12/273,337 dated Jun. 17, 2011, 16 pages.

Non-Final Office Action for U.S. Appl. No. 13/325,754 dated Dec. 30, 2013, 14 pages.

Non-Final Office Action for U.S. Appl. No. 13/526,067 dated Oct. 22, 2012, 23 pages.

Non-Final Office Action for U.S. Appl. No. 13/908,571 dated Sep. 6, 2013, 11 pages.

Non-Final Office Action for U.S. Appl. No. 14/449,865 dated Feb. 3, 2016, 9 pages.

Non-Final Office Action for U.S. Appl. No. 14/558,507 dated Mar. 17, 2016, 18 pages.

Non-Final Office Action for U.S. Appl. No. 14/558,507 dated Sep. 20, 2015, 21 pages.

Non-Final Office Action for U.S. Appl. No. 14/925,893 dated Feb. 25, 2016, 37 pages.

Non-Final Office Action for U.S. Appl. No. 14/925,893 dated May 16, 2016, 13 pages.

Non-Final Office Action for U.S. Appl. No. 14/925,899 dated Apr. 14, 2016, 25 pages.

Non-Final Office Action for U.S. Appl. No. 14/925,899 dated Jan. 5, 2016, 21 pages.

Non-Final Office Action for U.S. Appl. No. 14/925,899 dated May 25, 2016, 18 pages.

Non-Final Office Action for U.S. Appl. No. 14/927,213 dated Feb. 25, 2016, 33 pages.

Non-Final Office Action for U.S. Appl. No. 15/061,648 dated Jul. 12, 2016, 47 pages.

Non-Final Office Action for U.S. Appl. No. 15/137,951, dated Oct. 24, 2016, 28 pages.

Non-Final Office Action for U.S. Appl. No. 15/145,739 dated Jul. 27, 2016, 22 pages.

Non-Final Office Action for U.S. Appl. No. 15/187,618, dated Aug. 18, 2016, 13 pages.

Non-Final Office Action for U.S. Appl. No. 15/197,354, dated Jan. 19, 2017, 36 pages.

Non-Final Office Action for U.S. Appl. No. 15/355,408, dated Feb. 8, 2017, 26 pages.

Non-Final Office Action for U.S. Appl. No. 15/368,168, dated Mar. 13, 2017, 36 pages.

Non-Final Office Action for U.S. Appl. No. 15/371,103, dated Jan. 25, 2017, 45 pages.

Notice of Allowance for Canadian Patent Application No. 2,930,065, dated Feb. 9, 2017 from the Canadian Intellectual Property Office.

Notice of Allowance for Canadian Patent Application No. 2,936,225, dated Jan. 16, 2017 from the Canadian Intellectual Property Office.

Notice of Allowance for U.S. Appl. No. 12/273,337 dated Mar. 26, 2012, 8 pages.

Notice of Allowance for U.S. Appl. No. 13/325,754 dated Jun. 18, 2014, 10 pages.

Notice of Allowance for U.S. Appl. No. 13/526,067 dated Feb. 6, 2013, 8 pages.

Notice of Allowance for U.S. Appl. No. 14/161,143, dated Nov. 13, 2014, 18 pages.

Notice of Allowance for U.S. Appl. No. 14/449,865 dated Nov. 16, 2016, 15 pages.

Notice of Allowance for U.S. Appl. No. 14/588,507 dated Dec. 4, 2015, 11 pages.

Notice of Allowance for U.S. Appl. No. 14/588,507 dated May 3, 2016, 7 pages.

Notice of Allowance for U.S. Appl. No. 14/672,819, dated Jan. 27, 2017, 14 pages.

Notice of Allowance for U.S. Appl. No. 14/925,893, dated Jul. 20, 2016, 9 pages.

Notice of Allowance for U.S. Appl. No. 14/925,899, dated Aug. 3, 2016, 9 pages.

Notice of Allowance for U.S. Appl. No. 14/927,213 dated May 11, 2016, 12 pages.

Notice of Allowance for U.S. Appl. No. 15/061,648, dated Sep. 23, 2016, 9 pages.

Notice of Allowance for U.S. Appl. No. 15/137,951 dated Feb. 28, 2017, 10 pages.

Notice of Allowance for U.S. Appl. No. 15/145,739 dated Nov. 17, 2016, 11 pages.

(56) References Cited

OTHER PUBLICATIONS

Notice of Allowance for U.S. Appl. No. 15/158,508 dated Sep. 21, 2016, 8 pages.
Notice of Allowance for U.S. Appl. No. 15/187,618 dated Nov. 30, 2016, 12 pages.
Notice of Allowance for U.S. Appl. No. 15/207,411 dated Jan. 20, 2017, 23 pages.
Notice of Allowance for U.S. Appl. No. 15/371,103 dated Apr. 12, 2017, 10 pages.
Translated Office Action issued by the German patent and Trade Mark Office dated Dec. 19, 2016 for Application No. 102016008225.9, 5 pages.
Translated Office Action issued by the German patent and Trade Mark Office dated Feb. 16, 2017 for Application No. 102016008226.7, 6 pages.
Translated Office Action issued by the German patent and Trade Mark Office dated Mar. 16, 2017 for Application No. 102016008825.7, 8 pages.
Translated Office Action issued by the German patent and Trade Mark Office dated Mar. 2, 2017 for Application No. 102016009125.8, 5 pages.
U.S. Appl. No. 61/101,611 to Schnuckle, filed Sep. 30, 2008.
U.S. Appl. No. 61/293,516 to Patton, filed Jan. 8, 2010.
UK Combined Search and Examination Report for GB1613387.8, dated Sep. 9, 2016, 10 pages.
UK Combined Search and Examination Report for GB1613391.0, dated Sep. 19, 2016, 9 pages.
UK Combined Search and Examination Report for GB1613393.6, dated Sep. 9, 2016, 10 pages.
Supplementary Search Report and Written Opinion for European Patent Application No. 11800163.5, dated Feb. 26, 2015.
International Search Report and Written Opinion for International Patent Application No. PCT/CN11/76449, dated Oct. 13, 2011.
Supplementary Search Report and Opinion for EP 14764844, dated Jul. 28, 2016, 12 pages.
*Decorware International, Inc.* v. *L&L Candle Company LLC* before the USPTO Patent Trial and Appeal Board, IPR2020-01233; dated Jul. 2, 2020; 93 pages.
Exhibit 1008, Declaration of Eric Bretschneider, Ph.D. submitted in IPR2020-01233; dated Jul. 2, 2020; 82 pages.
Exhibit 1015, T-1 3/4 (5mm), T-1 (3mm), High Performance AlInGaP LED Lamps, Technical Data Sheet (1998)—Hewlett Packard; 9 pages; submitted in IPR2020-01233.
*Shenzhen Liown Electronics Co., Ltd.,* v. *Luminara Worldwide, LLC et al.,* Case No. 14-cv-3112 SRN-FLN, in the United Strict Court of Minnesota, Exhibit 5 to Declaration of Paul J. Robbenolt in Support of Plaintiff's Motion for Preliminary Injunction, filed Mar. 27, 2015; 93 pages.
Sterno Home, Inc., Ningobo Huamao International Trading Co., Ltd. and Ningbo Langsheng Artware Co., Ltd. Response to Complaint and Notice of Investigation in Inv. No. 337-TA-1195 before the United States International Trade Commission, filed May 11, 2020, 58 pages.

\* cited by examiner

ELECTRONIC LIGHTING DEVICE AND METHOD FOR MANUFACTURING SAME

CROSS REFERENCE TO RELATED APPLICATIONS

The present application is a continuation of U.S. patent application Ser. No. 16/942,419, filed on Jul. 29, 2020, which is a continuation of U.S. patent application Ser. No. 15/947,648, filed on Apr. 6, 2018, now U.S. Pat. No. 10,794,556, which is a continuation of U.S. patent application Ser. No. 15/187,640, filed Jun. 20, 2016, now U.S. Pat. No. 10,060,585, which is a continuation of U.S. application Ser. No. 14/927,213, filed Oct. 29, 2015, now U.S. Pat. No. 9,371,973, which is a continuation-in-part of U.S. patent application Ser. No. 14/588,507, filed Jan. 2, 2015, now U.S. Pat. No. 9,366,402, which is a continuation of U.S. patent application Ser. No. 14/161,143, filed Jan. 22, 2014, now U.S. Pat. No. 8,926,137, which is a continuation of U.S. patent application Ser. No. 13/325,754, filed Dec. 14, 2011, now U.S. Pat. No. 8,789,986, which is a continuation-in-part of International PCT Patent Application No. PCT/CN2011/076449, filed Jun. 27, 2011, which claims priority to Chinese Patent Application No. 201010211402.8, filed Jun. 28, 2010, each of which is hereby incorporated by reference in its entirety.

TECHNICAL FIELD

The present application relates to an electronic lighting device.

BACKGROUND

In our daily life, various electronic lighting devices are widely applied to toys, home decoration products and gifts. For instance, candles, kerosene lamps and so on are originally used as lamps for illumination. However, people are no longer concerned about the illumination function of candles and kerosene lamps as electrical light sources are used commonly. The candles and kerosene lamps are thus used for interestedness or appreciation rather than illumination. Recently, various electronic lighting devices, such as electronic flashing candles, electronic candles, simulated candles and simulated kerosene lamps and the like, emerge as required. Lighting parts of such electronic lighting devices try to simulate lighting patterns of candles or kerosene lamps, namely, to simulate flashing and flickering flames of candles or kerosene lamps. However, compared with the flames of candles or kerosene lamps, the lighting parts of the electronic lighting devices are quite different and have not enough realistic visual effect.

For instance, a type of electronic candle is disclosed in a Chinese application No. 200520035772.5, titled "Electronic Simulated Flashing Candle". The electronic candle comprises a flame shell shaped as true flames, LED elements disposed in the flame shell, and a control circuit. The control circuit controls lighting sequences of the LED elements such that the LED elements flash on and off. As a result, a visual experience of winkling and jumping light is given by the electronic candle and thus the interestedness or appreciation of the electronic candle is enhanced.

SUMMARY

An objective of the present application is to provide an electronic lighting device for simulating true fire and a method for manufacturing the same to simulate true fire with an enhanced visual experience.

According to an aspect of the present application, an electronic lighting device comprising a core is provided. The core may comprise: an enclosure provided with a through hole on a top thereof; a flame sheet movably supported or suspended on the enclosure, wherein the flame sheet comprises an upper sheet which is of a flame-like shape, and the upper sheet is configured to expose above the top of the enclosure through the through hole of the enclosure; a light-emitting element installed on a sidewall of the enclosure such that an outgoing direction of a light from the light-emitting element is inclined upward and passing through the through hole of the enclosure, wherein the outgoing direction is intersected with a surface of the upper sheet, so that the light from the light-emitting element is projected on the surface of the upper sheet, and a swing mechanism disposed beneath the flame sheet, wherein the swing mechanism is configured to apply a force on the flame sheet to actuate the flame sheet to sway or swing.

According to another aspect of the present application, a method for manufacturing an electronic lighting device is provided. The method may comprises: suspending a flame sheet on an enclosure, wherein the flame sheet comprises a upper sheet which is of a flame-like shape and exposed above a top of the enclosure; installing a light-emitting element on a sidewall of the enclosure such that an outgoing direction of a light from the light-emitting element is inclined upward and passing through a through hole of the enclosure to be intersected with a surface of the upper sheet, so that the light from the light-emitting element is projected on the surface of the upper sheet; and disposing a swing mechanism beneath the flame sheet, wherein the swing mechanism is configured to apply a force on the flame sheet to actuate the flame sheet to sway or swing.

In the present application, by the cooperation of the flame sheet with the light projected thereon, the flame sheet may sway or swing under the action of its own gravity and the swing mechanism. The light given off by the light-emitting element is projected on the flame sheet and looks like a true flickering flame so that the flame simulated by the lighting device is closer to the wick flame of the traditional lighting device such as a candle, a kerosene lamp and the like. In the case where the device according to the present application is applied to electronic products, such as electronic candles or simulated kerosene lamps and the like, it further improves the visual experience of the electronic products and provides the electronic products with enhanced interestedness and appreciation.

In some embodiments, since the swing mechanism in the device of the present application uses a magnetic mechanism, the flame sheet maintains to sway randomly or disorderly in use, so that the light projected on the flame sheet keeps flickering and looks like a true flame.

In some embodiments, in the device of the present application, the light given off by the light-emitting element has an emission angle within a specific range, so that the light is assured to be projected on the flame sheet, and thus the visual effect of simulating true fire is assured.

In some embodiments, the shell is simulated in to a traditional candle in shape, so that the device of the present application is closer to the traditional candle in visual effect.

DETAILED DESCRIPTION

Hereinafter, a detailed description of the present application will be given by specific embodiments and with reference to the appended drawings.

Embodiment 1

Figure 1:
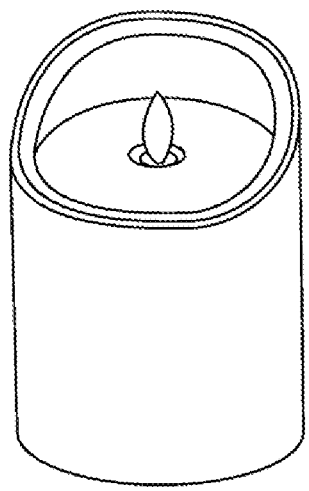
FIG. 1 is a schematic view showing an appearance of an electronic candle according to a first embodiment of the present application.
Figure 2:
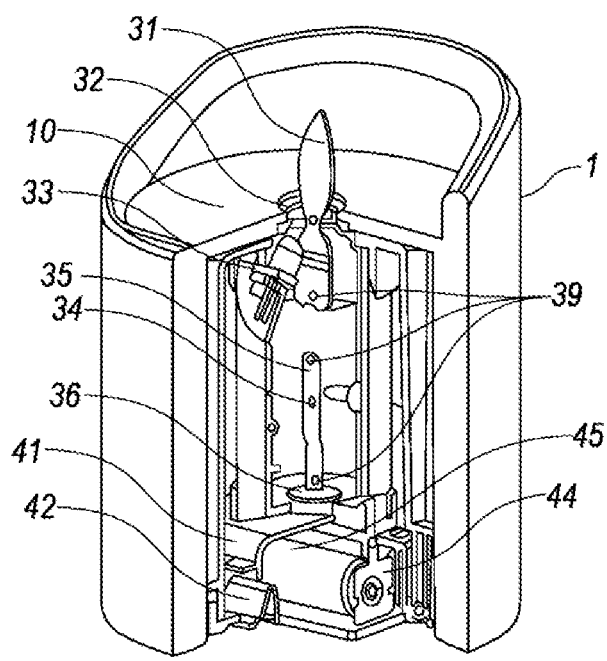
FIG. 2 is a cross-sectional view showing a structure of the electronic candle according to the first embodiment of the present application.

In particular, the present application provides an electronic candle, with reference to FIGS. 1 to 5. FIG. 1 is a schematic view showing the appearance of the electronic candle according to the first embodiment. The electronic candle, which is shaped as a true candle, comprises: a shell 1, a casing 2 sleeved within the shell 1, a core 3 and a base 4 installed within the casing 2. The casing 2 is provided with a through hole at the top-center. A flame sheet is arranged in the through hole. A portion of the flame sheet which protrudes outsides through the through hole is shaped as a flame of a burning candle. The light emitted from a light-emitting element which is disposed on the core 3 is projected, at an angle, onto the portion of the flame sheet which protrudes outsides through the through hole. Further, the flame sheet may sway freely under the action of natural winds or a swing mechanism arranged within the core 3. In this way, the flame simulated by the electronic candle, when viewed from a distance, flickers like that of a true candle, as if it is a perfectly realistic flame, and thus can be scarcely distinguished from the true one.

As shown in FIGS. 2 to 5, the core 3 comprises an enclosure, a flame sheet 31, a LED light 33 and a swing mechanism. The enclosure comprises left and right caps 38 and 38' having symmetrical shapes with each other. A cylindrical cavity is formed when the left and right caps 38 and 38' are arranged to engage with each other. Each of the left and right caps 38 and 38' has a semicircular notch on the top, such that a circular opening 380 is formed on the top of the cavity by the semicircular notches when the left and right caps 38 and 38' are arranged to engage with each other. The left and right caps 38 and 38' have respective left and right notches 381 and 381' on the upper portions of their sidewalls. The left and right notches 381 and 381' are concaved inwardly and inclined at a certain angle with respect to the sidewalls in such a way that an installation location for the LED light, which inclines toward and communicates with the opening 380, is formed by the left and right notches 381 and 381' when the left and right caps 38 and 38' are arranged to engage with each other. The LED light 33 is then installed at this installation location such that an angle between a longitudinal central axis of the LED light 33 and that of the cavity is about 35 degree. Moreover, the LED light 33 may be a LED element emitting concentrated light with a relatively narrow emission angle (7-10 degree). Further, combined with an appropriate area of an upper sheet 311 of the flame sheet 31, it can be assured that light emitted from the LED light 33 is maintained to be projected onto the surface of the flame sheet 31. As a result, light beams are increased in brightness and form an elliptical light spot on the surface of the flame sheet 31, so that the flame sheet 31 looks more like a flame of a true candle in shape.

Figure 6:
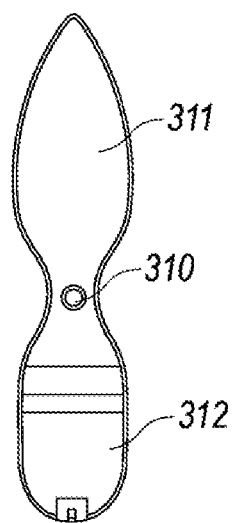
FIG. 6 is a schematic view showing a structure of a flame sheet of the electronic candle according to the first embodiment of the present application.

With reference to FIG. 6, the flame sheet 31 is of sheet type, and provided with a through hole 310 at the middle part. The flame sheet 31 is divided, by the through hole 310, into a upper sheet 311 shaped as a flame of a burning candle and a lower sheet 312. The lower sheet 312 has a counterweight slightly heavier than that of the upper sheet 311, so that the flame sheet 31 is vertically suspended in a free state (under the action of its own gravity without any external force). A supporting rod 32 passes through the through hole 310 and spans across the opening 380 of the core's cavity. The supporting rod 32 is V-shaped and depressed slightly at the middle so that the flame sheet 31 is suspended steadily at the lowest point of the supporting rod 32 since the lower sheet 312 has a counterweight slightly heavier than that of the upper sheet 311. It is easier for the flame sheet suspended vertically in a free state (under the action of its own gravity without any external force) to sway randomly under the action of an external force. In this way, the supporting rod 32 spanning across the opening 380 of the core's cavity may enable the flame sheet 31 to sway randomly under the action of an external force, such as natural winds. However, the supporting rod 32 may maintain a relatively fixed position relationship between the upper sheet 311 of the flame sheet 31 and the light outgoing direction of the LED light 33 such that the light from the LED light 33 can be projected onto the surface of the upper sheet 311 of the flame sheet 31. Since the flame sheet 31 is manufactured by a semitransparent material, a portion of the light can emerge from the back of the flame sheet 31 when the light is projected onto the flame sheet 31. In order to improve the effect of simulating a true candle's flame, a wire is embedded in the flame sheet 31 at the bottom of the upper sheet 311 to simulate a candlewick. In the case where the wire is irradiated by the light of the LED light 33 projected on the upper sheet 311, as if there is a candlewick within a flame, such that the flame sheet 31 is more like the flame of a true burning candle in visual effect. In addition, since the supporting rod 32 is irradiated by the LED light 33, a shadow of the supporting rod 32 is formed on the surface of the upper sheet of the flame sheet 31 and may also look like the candlewick.

The tubular shell 1 is manufactured by a transparent or semitransparent material, such as PVC. The shell 1 comprises a tubular sidewall and a diaphragm plate 10 intersected with the tubular sidewall. A through hole is provided at the middle of the diaphragm plate 10, from which the upper sheet 311 of the flame sheet 31 protrudes outsides. In order to simulate irregular wax melting when a candle is burning, a portion of the shell's sidewall above the diaphragm plate 10 is formed to have an irregular end face. For example, the sidewall may be lower in front and higher behind. The surfaces of the shell's sidewall and the diaphragm plate 10 are coated with candle wax, such that the electronic candle looks more like a true candle. The upper sheet 311 of the flame sheet 31 protrudes outsides through the through hole of the diaphragm plate 10, with its front surface (the surface projected by the light) facing a lower point of the sidewall and its back surface obscured by a higher sidewall of the shell. In this way, a user is guided to dispose the electronic candle at a preferable angle to appreciate the "candle light", that is to say, the electronic candle is viewed from the front surface of the upper sheet 311 of the flame sheet 31 and from the lower point of the sidewall. Accordingly, the effect for simulating a true candle by the electronic candle according to the first embodiment can be improved.

Figure 4:
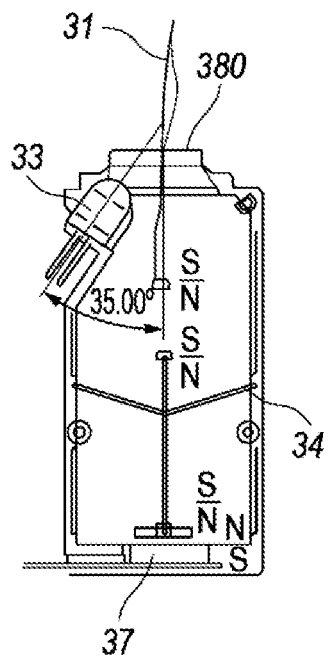
FIG. 4 is a schematic view showing a structure of a core of the electronic candle according to the first embodiment of the present application.
Figure 5:
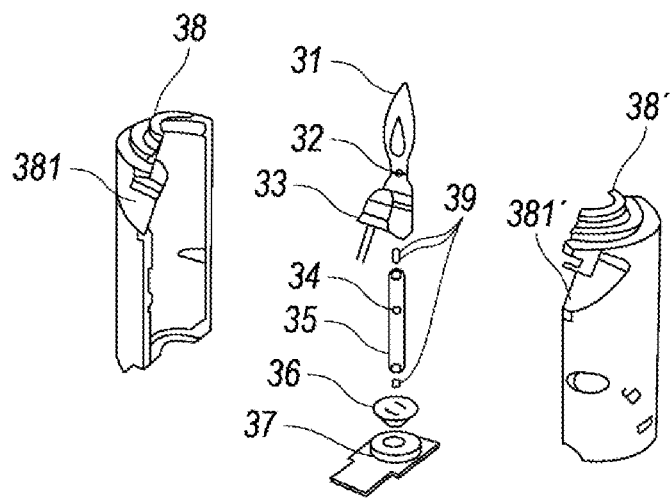
FIG. 5 is an exposed view schematically showing the structure of the core of the electronic candle according to the first embodiment of the present application.

In order to assure the effect of swaying of the flame sheet, the core is provided with a swing mechanism which maintains to act on the flame sheet directly or indirectly with a force such that the flame sheet maintains to sway or swing. As shown in FIGS. 4 and 5, the swing mechanism in the embodiment uses a magnetic mechanism comprising a set of magnets 39, a linkage sheet 35, a linkage rod 34 and a coil 37. The set of magnets 39 comprises a first magnet, a second magnet and a third magnet. The linkage rod 34 is movably threaded through the linkage sheet 35, and arranged to span across the core's cavity. The linkage rod 34 is V-shaped, and depressed slightly at the middle so that the linkage sheet 35 is positioned at the lowest point at the middle of the linkage rod 34. The linkage sheet 35 may be suspended freely in the core's cavity without any external force. The second and third magnets are adhered to or embedded into the upper and lower ends of the linkage sheet 35, respectively. The first magnet is adhered to or embedded into the lower end of the flame sheet 31. A magnetic pole of the first magnet facing the second magnet has a polarity opposite or same to that of a magnetic pole of the second magnet at the upper end of the linkage sheet 35 facing the first magnet, that is to say, they may attract or repel each other. The coil 37 is fastened onto a PCB subboard through a snap ring 36, and disposed beneath the lower end of the linkage sheet 35 so as to be opposite to the third magnet at the lower end of the linkage sheet 35.

The operation principle on the swaying or swinging of the flame sheet 31 is illustrated below. Firstly, an oscillation is output through a control circuit. When powered on, the coil 37 then produces a magnetic field which is opposite to the polarity of the magnet pole of the third magnet at the lower end of the linkage sheet 35 facing the coil so that the coil 37 and the third magnet at the lower end of the linkage sheet 35 repel each other. As a result, the linkage sheet 35 sways toward one side. Moreover, since the second magnet at the upper end of the linkage sheet 35 and the first magnet at the lower end of the flame sheet 31 attract or repel each other, the flame sheet 31 sways. When the coil 37 is powered off, the flame sheet 31 freely falls down under the action of its own gravity, and continues to sway in an opposite direction under an inertia potential energy until the coil 37 is powered on again. Then the inertial motion of the flame sheet 31 is changed by the magnetic force of the coil 37 via the linkage sheet 35, and a next sway cycle begins.

Figure 3:
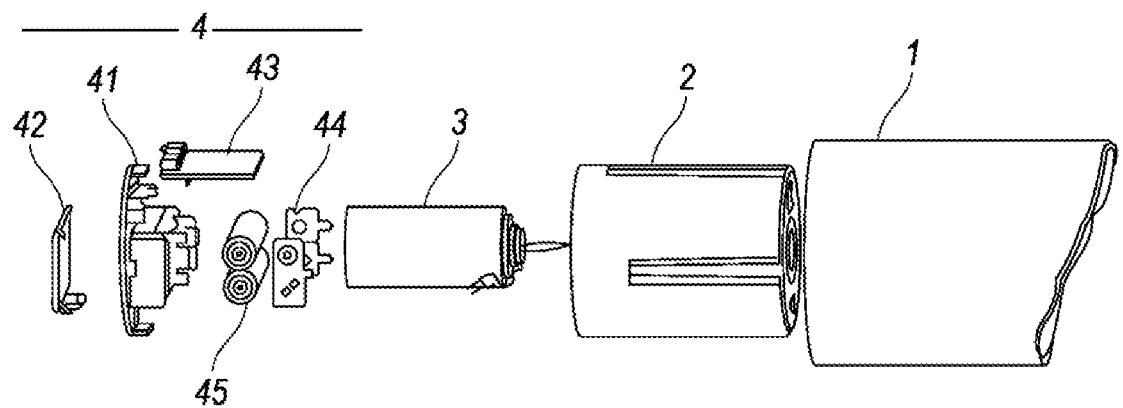
FIG. 3 is an exposed view schematically showing the structure of the electronic candle according to the first embodiment of the present application.

As shown in FIGS. 3 and 4, the base 4 comprises a battery tray 41, a battery cover 42, a PCB mainboard 43 and pieces of battery shrapnel 44. The pieces of battery shrapnel 44 are installed on the battery tray 41 to form a battery chamber for accommodating batteries 45. The PCB mainboard 43 is installed on the battery tray 41 and arranged at one side of the battery chamber. The control circuit and a power switch are arranged on the PCB mainboard 43. The PCB mainboard 43 is electrically connected, via wires, with the LED light 33, the PCB subboard installed with the coil 37, and the pieces of batter shrapnel. The battery cover 42 is arranged at the bottom of the battery tray 41 and can be removed to enable the displacement of the batteries in the battery chamber. The core 3 is installed on the base 4, wherein the PCB subboard installed with the coil 37 is electrically connected with the PCB mainboard 43. The circumference of the battery stray 41 and the bottom of the casing 2 may be snapped together, or may be threaded with each other through a bolt. The casing 2 is a hollow cylinder, the external diameter of which is equal to or slightly larger than the internal diameter of the shell 1 so as to be tightly fitted into the shell 1. The casing 2 is provided with a through hole on the top, which is used for mating with the core 3. When the core 3 is received within the casing 2, the upper sheet 311 of the flame sheet 31 is exposed out of the casing 2 through the casing's through hole.

Figure 7:
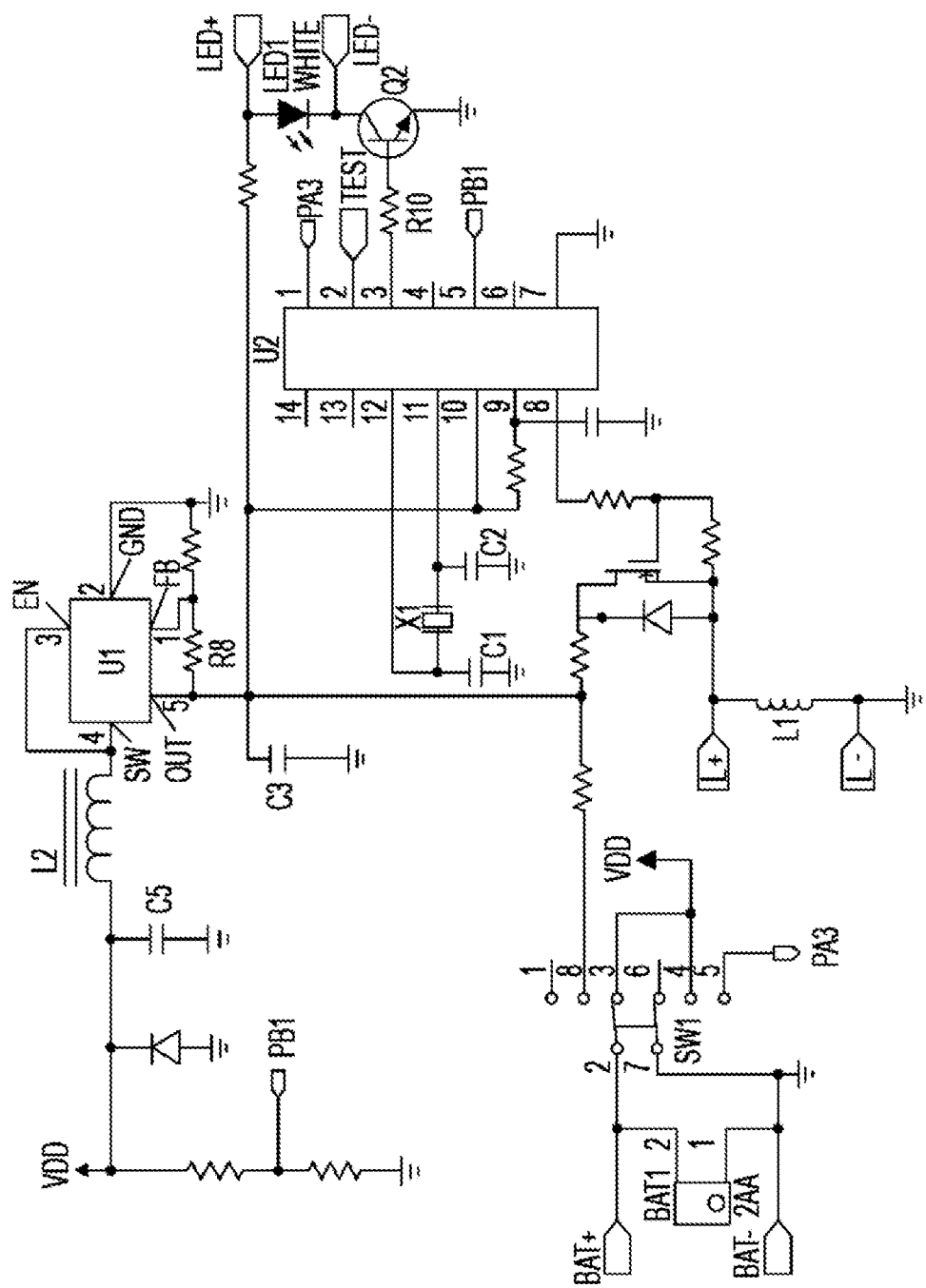
FIG. 7 is a schematic diagram showing a circuit part of the electronic candle according to the first embodiment of the present application.

FIG. 7 is a circuit schematic diagram of the embodiment. The operation principle of the electronic candle according to the embodiment is illustrated below with reference to FIG. 7.

In the power source part, the energy provided by the batteries is transferred, via a switch SW1, to an input pin of a boost converter U1, then into a boost circuit consisting of components such as a fifth capacitor C5, a second inductor L2, the boost converter U1, a third capacitor C3 and an eighth resistor R8. A stable voltage of 3.3V is then output from a fifth pin of the boost converter U1 to be supplied to a microprocessor U2, a LED light LED1 (expressed as the LED light 33 in the structure described above, using a warm white light similar to true fire in color) and a coil L1.

In the case where the switch SW1 is closed such that the circuit is powered by the power source part, the microprocessor U2 starts to work upon receiving a 3.3-volt voltage. When a voltage at a fifth pin (PB1) of the microprocessor U2 is above 1.82-volt, the microprocessor U2 controls an eighth pin (PWM/PCO) to output a square wave pulse of 40 ms on and 630 off. A MOS transistor Q1 and the coil L1 are controlled through the square wave pulse to oscillate so as to produce a magnetic field. In the case that the magnetic field produced by the magnet at the lower end of the linkage sheet 35 is the same as that produced by the coil (both are N poles or S poles), the coil repels the magnet. The magnet then brings the linkage sheet 35 to sway toward left or right. Further, in the case that the magnetic field produced by the magnet at the upper end of the linkage sheet 35 is opposite to that produced by the magnet at the lower end of the flame sheet 31, the linkage 35 drives the flame sheet 31 to sway toward right or left since the linkage sheet 35 and the flame sheet 31 are arranged to be a distance from each other. Meanwhile, the microprocessor U2 controls a third pin (PB3) to output a high level so as to supply about a 0.6-volt voltage to the base of a triode Q2 via a resistor R10. Once the triode Q2 is turned on, the LED light LED1 is lighted. Then the light is projected onto the flame sheet at an angle of 35 degree. Under the action of the coil, the flame sheet, as viewed from a distance, is very similar to that of a burning candle. The optimum viewing distance is farther than 1 m from the electronic candle, the viewing angle being smaller than 120 degree.

The work of circuit in the case where the switch is switched such that the circuit is controlled by a timer and a first pin (PA3) of the microprocessor U2 is at a low level is illustrated below. On one hand, the microprocessor U2 controls the eighth pin (PWM/PCO) to output a square wave pulse of 40 ins on and 630 ins off after halting for 500 ms. The MOS transistor Q1 and the coil are controlled through the square wave pulse to oscillate so as to produce a magnetic field. In the case that the magnetic field produced by the magnet at the lower end of the linkage sheet 35 is the same as that produced by the coil (both are N poles or S poles), the coil repels the magnet. The magnet then brings the linkage sheet 35 to sway toward left or right. Further, in the case that the magnet at the upper end of the linkage sheet 35 produce a magnetic field which is opposite to that produced by the magnet at the lower end of the flame sheet 31, the linkage sheet 35 drives the flame sheet 31 to sway toward right or left since the linkage sheet 35 and the flame sheet 31 are arranged to be a distance from each other. Meanwhile, the microprocessor U2 controls the third pin PB3 to output a high level after halting for 500 ins (that is to say, the LED light LED1 blinks for once) so as to apply about a 0.6-volt voltage to the base of the triode Q2 via the tenth resistor R10. Once the triode Q2 is turned on, the LED light LED1 is lighted. On the other hand, an oscillation circuit, which consists of a crystal oscillator X1, a first capacitor C1 and a second capacitor C2, provides standard clock information to the microprocessor U2. The timer of the microprocessor U2 starts timing upon the LED light LED1 blinks. After 5 hours, the microprocessor U2 will controls the eighth pin (PWM/PCO) and the third pin (PB3) to output a low level, so that the flame sheet stops swaying and the LED light LED1 goes out. After next 19 hours, the microprocessor U2 controls the eighth pin (PWM/PCO) to output a square wave of 40 ins on and 630 ins off, and the PB3 to output a high level, so that the flame sheet starts to sway and the LED light LED1 is lighted. In view of the above, the total time of a cycle is 24 hours. The circuit can circularly work in this way, until the batteries exhaust or the switch is switched into other states.

When the battery voltage is below 1.62 volt, the LED light will go out no matter that the switch is switched such that the circuit is powered by the power source part or controlled by a timer. Meanwhile, the flame sheet stops swaying, and the control circuit goes to a sleep state. The circuit restores to work until the batteries are replaced with new ones.

When the switch is opened, the boost converter U1 and the microprocessor U2 stop working since they are not powered by the batteries. As a result, the LED light will go out, meanwhile, the flame sheet 31 stops swaying.

Embodiment 2

Figure 8:
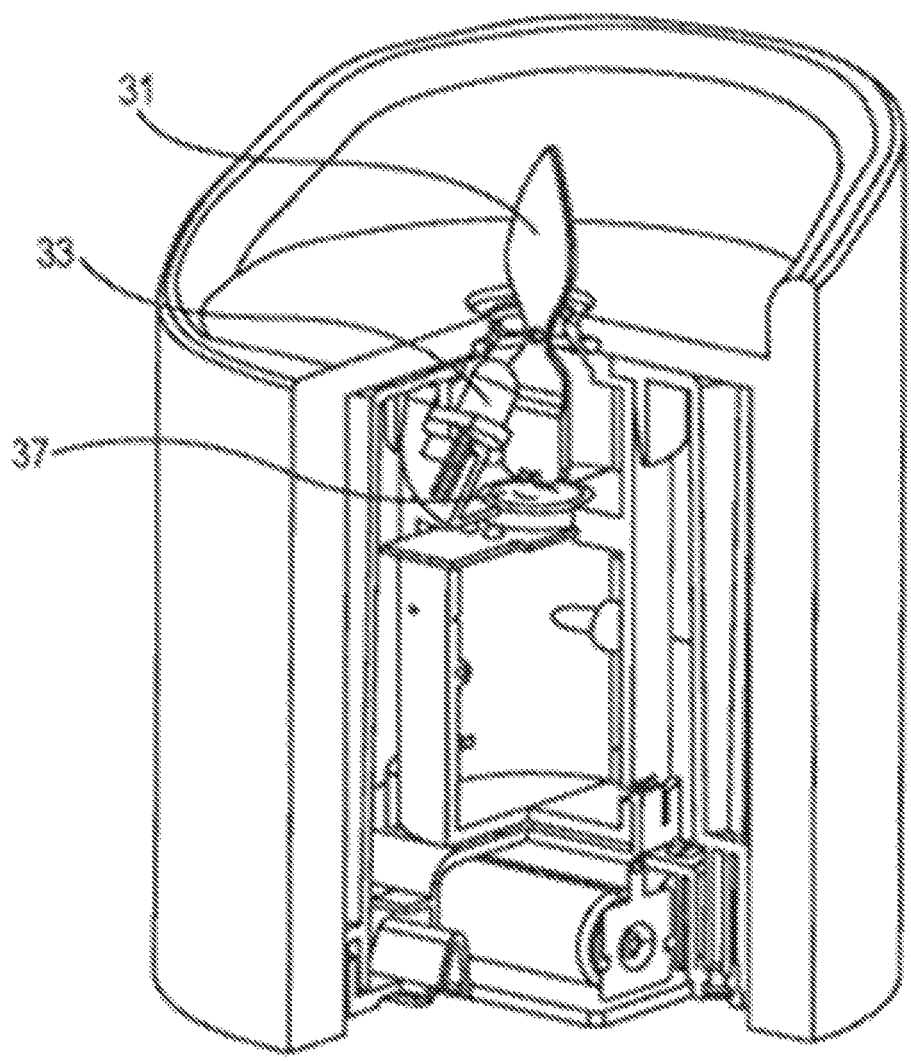
FIG. 8 is a cross-sectional view showing a structure of an electronic candle according to a second embodiment of the present application.

With reference to FIG. 8, the swing mechanism according to the first embodiment is simplified according to the second embodiment. The linkage sheet 35 and components attached thereto, such as the linkage sheet 34 and two magnets at both ends thereof, are omitted. Thus, the coil 37 is disposed adjacent to the lower end of the flame sheet 31. In the case that the coil 37 produces a magnetic field which is opposite to that produced by the magnet at the lower end of the flame sheet 31, the coil 37 and the flame sheet 31 repel each other so as to keep the flame sheet 31 swaying.

Embodiment 3

Figure 9:
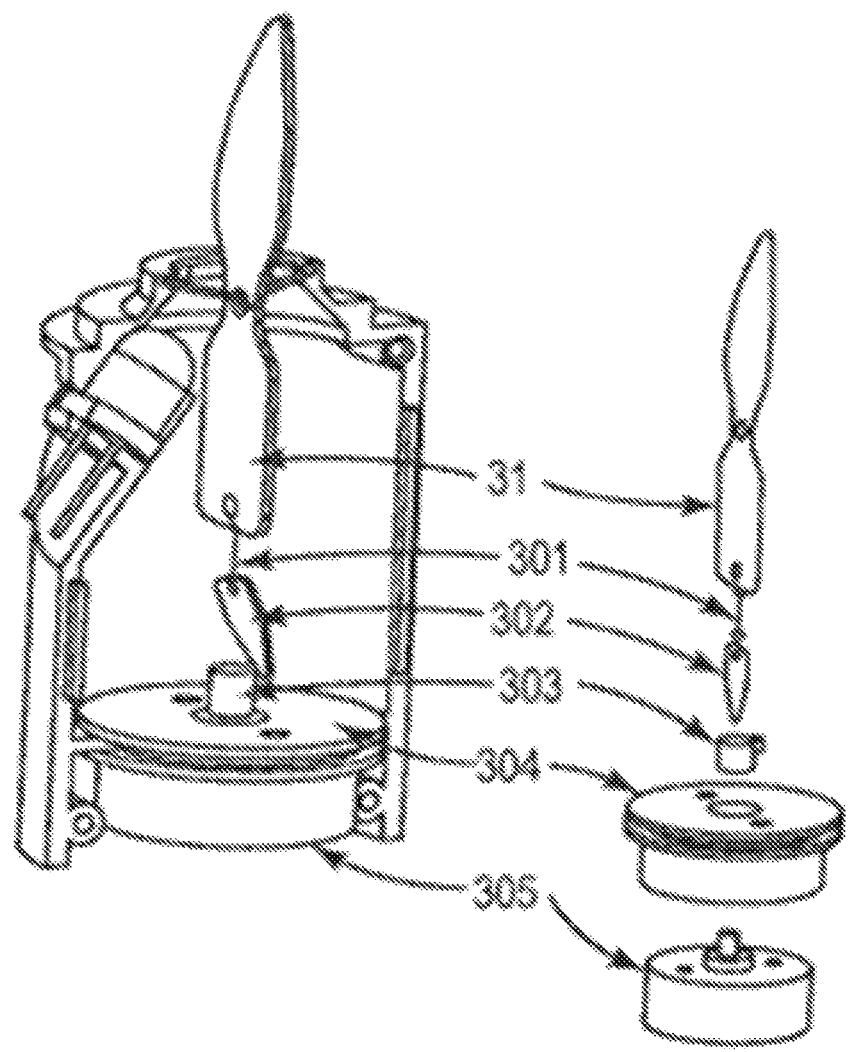
FIG. 9 is an exposed view schematically showing a structure of a core of an electronic candle according to a third embodiment of the present application.

In this embodiment, the swing mechanism in the core 3 according to the first embodiment is replaced with a swing mechanism according the third embodiment. With reference to FIG. 9, the swing mechanism according to the third embodiment comprises a hanging rope 301, a swing piece 302, a rotary block 303, a motor fixed block 304 and a motor 305. The upper end of the hanging rope 301 is hanged to the lower end of the flame sheet 31, and the lower end of the hanging rope 301 is connected with the swing piece 302. The motor 305 is fixed within the core's enclosure by the motor fixed block 304. The rotary block 303 is fixed to the output shaft of the motor 305. In a natural state (under the action of gravity, without the action of any external force), the swing piece 302 is, depending on its own gravity, hanged to the hanging rope 301 and then the lower end of the swing piece 302 contacts with the rotary block 303. When the motor 305 is actuated, the rotary block 303 collides with the swing piece 302 continually. As a result, the swing piece 302 sways continually, which makes the flame sheet 31 sway disorderly.

Figure 10:
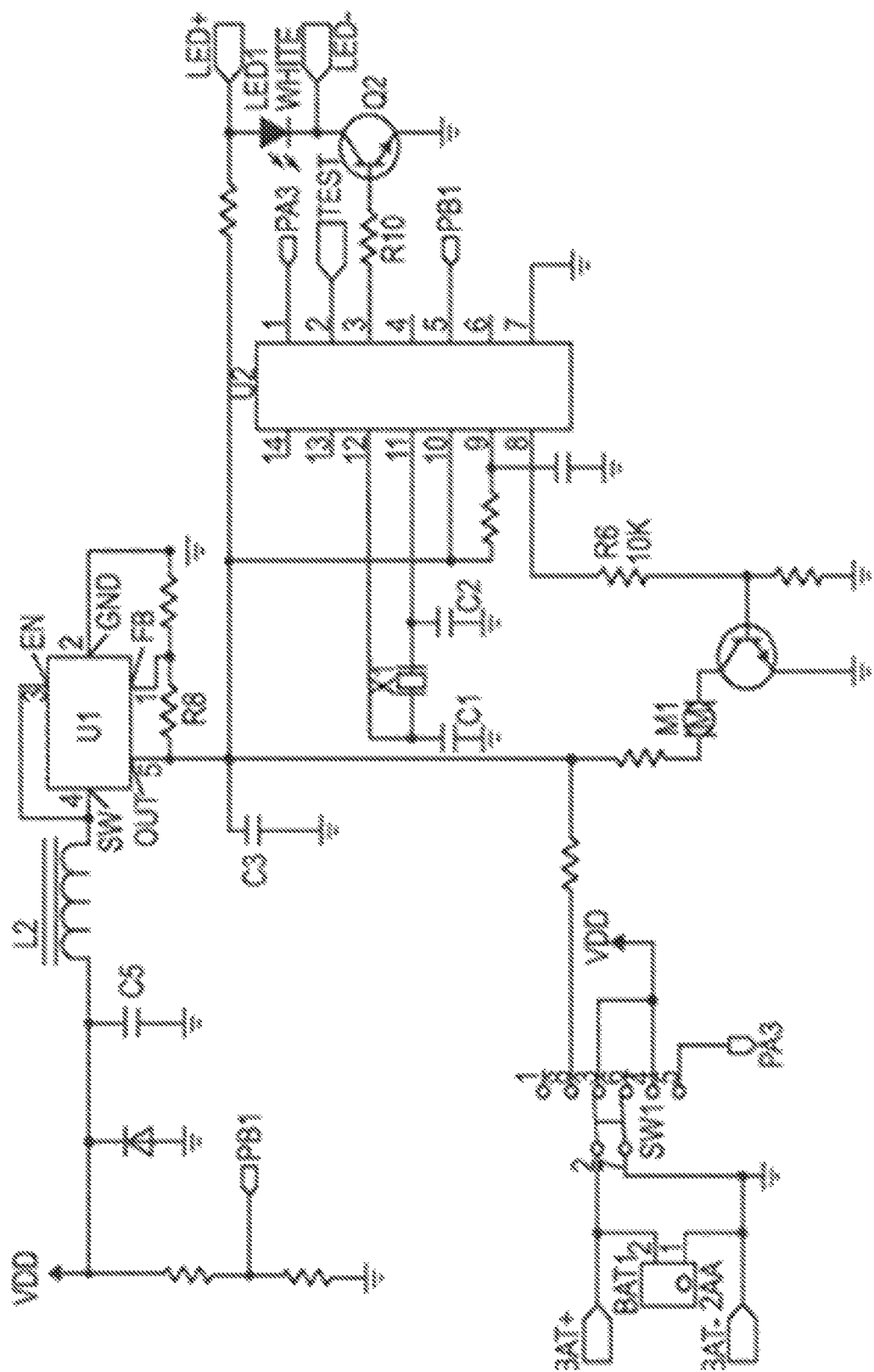
FIG. 10 is a schematic diagram of a circuit part of the electronic candle according to the third embodiment of the present application.

With reference to FIG. 10, a circuit schematic diagram according to the embodiment is shown. The operation of the swing mechanism is performed through controlling the rotation of the motor M1 with the eighth pin of the microprocessor U2.

Embodiment 4

Figure 11:
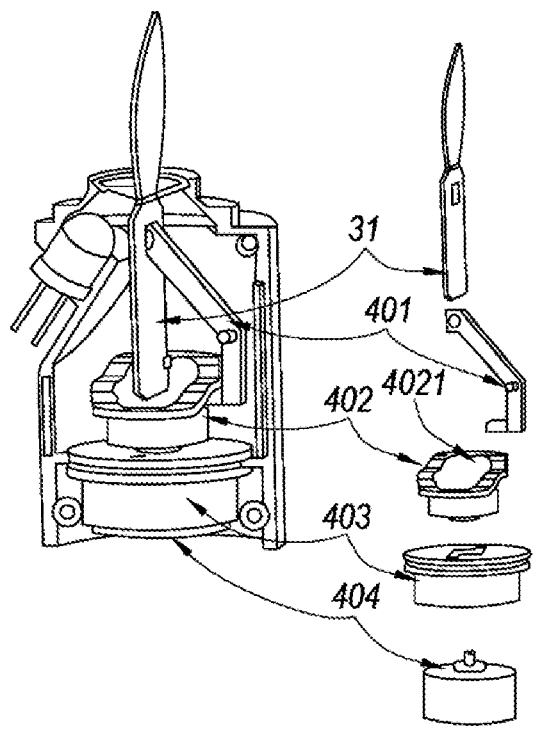
FIG. 11 is an exposed view schematically showing a structure of a core of an electronic candle according to a fourth embodiment of the present application.
Figure 12:
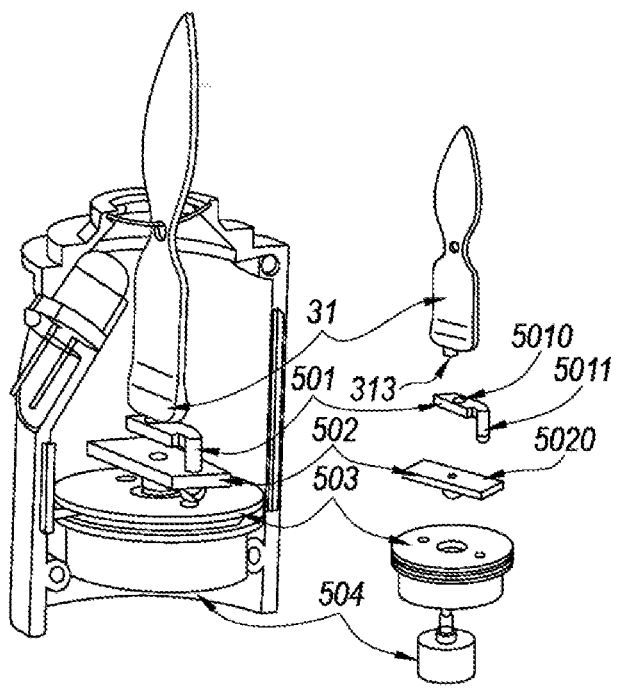
FIG. 12 is an exposed view schematically showing a structure of a core of an electronic candle according to a fifth embodiment of the present application.

In the fourth embodiment, the swing mechanism in the core 3 according to the first embodiment is replaced with a swing mechanism described below. With reference to FIG. 11, the swing mechanism according to the forth embodiment comprises a linkage rod 401, a rotary block 402, a motor fixed block 403 and a motor 404. The middle part of the flame sheet 31 is provided with a slot, in which the upper end of the linkage rod 401 is stuck. The bottom end of the linkage rod 401 contacts with the outer wall of the rotary block 402. The rotary block 402 has an irregular height, and is provide with a pan-like cavity at the middle part. Moreover, the sidewall of the pan-like cavity is provided with a tab 4021. The lower end of the flame sheet 31 is stretched into the pan-like cavity. In a natural state, the tab 4021 contacts with the lower end of the flame sheet 31. The motor 404 is fixed within the enclosure of the core by the motor fixed block 403. The rotary block 402 is fixedly connected to an output shaft of the motor 404. When the motor 404 is actuated and thus the rotary block 402 is forced to rotate, the outer wall of the rotary block 402 will continually collides with the bottom end of the linkage rod 401. As a result, the tab 4021 will continually (or intermittently) collides with the lower end of the flame sheet 31, which makes the flame sheet 31 sway or swing disorderly.

Embodiment 5

In the fifth embodiment, the swing mechanism in the core 3 according to the first embodiment is replaced with a swing mechanism described below. The swing mechanism according to the fifth embodiment comprises a connecting piece 501, a rotary block 502, a motor fixed block 503 and a motor 504. The lower end of the flame sheet 31 is provided with a snap-on piece 313, which can be snapped into a receiving piece 5010 of the connecting piece 501. The connecting piece 501 is L-shaped. An end of the connecting piece 501 far away from the receiving piece 5010 is provided with a snap-on piece 5011, which can be snapped into a receiving piece 5020 on the rotary block 502. The motor 504 is fixed within the enclosure of the core by the motor fixed block 503. The rotary block 502 is fixedly connected with an output shaft of the motor 504. When the motor 504 is actuated, the rotary block 502 brings the connecting piece 501 to rotate. The connecting piece 501 in turn brings the flame sheet 31 to sway.

Embodiment 6

Figure 13:
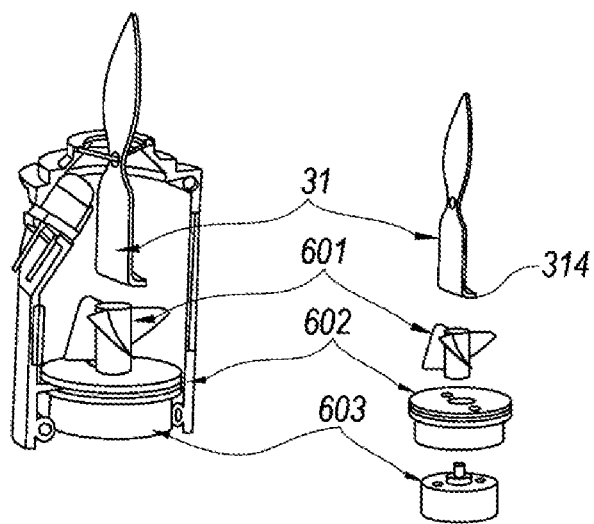
FIG. 13 is an exposed view schematically showing a structure of a core of an electronic candle according to a sixth embodiment of the present application.

In the sixth embodiment, the swing mechanism in the core 3 according to the first embodiment is replaced with a fan mechanism described below. With reference to FIG. 13, a fan is fixed within the enclosure of the core at the bottom of the cavity of the core. The fan comprises a wind wheel 601, a motor fixed block 602 and a motor 603. The air outlet direction of the wind wheel 601 is upward. The lower end of the flame sheet 31 is folded at an angle so as to form a baffle 314 which has a surface facing the air outlet direction of wind wheel 601. When the fan is activated, the surface of the baffle 314 of the flame sheet 31 is oriented to be upwind such that the flame sheet 31 continually sways under the action of the wind force, Embodiment 7

Figure 14:
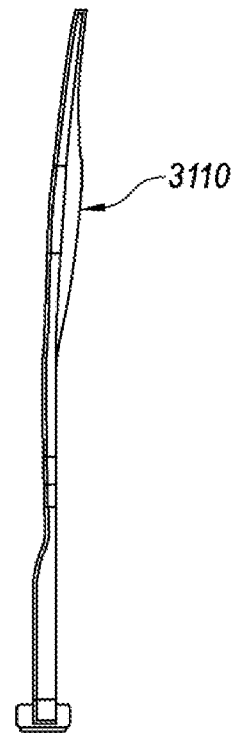
FIG. 14 is a schematic view showing a structure of a flame sheet of the electronic candle according to the seventh embodiment of the present application.

As shown in FIG. 14, the electronic candle according to the seventh embodiment is the same as that of the first embodiment, except for the upper sheet of the flame sheet. The upper sheet according to the seventh embodiment is slightly curved, which is concaved from one side. Flanks 3110 are provided at both sides of the concaved portion. The flanks 3110 and the concaved portion together form a depression onto which the light of the light-emitting element is projected. When the light of the light-emitting element is projected on the depression, a light spot is formed on the projected surface that is recessed with a certain depth rather than flat or curved. It seems that the depression is full of light. Further, when the flame sheet sways or swings disorderly, the light spot simulating a flame produces a stereovision effect.

In view of the above embodiments, all of the electronic candles can be powered by rechargeable batteries. In addition, a charge control circuit may be arranged on the PCB mainboard of the base, such that the electronic candle of the application is rechargeable using a Plug-and-socket charger or a charge seat.

Different Color Lights

Figure 15:
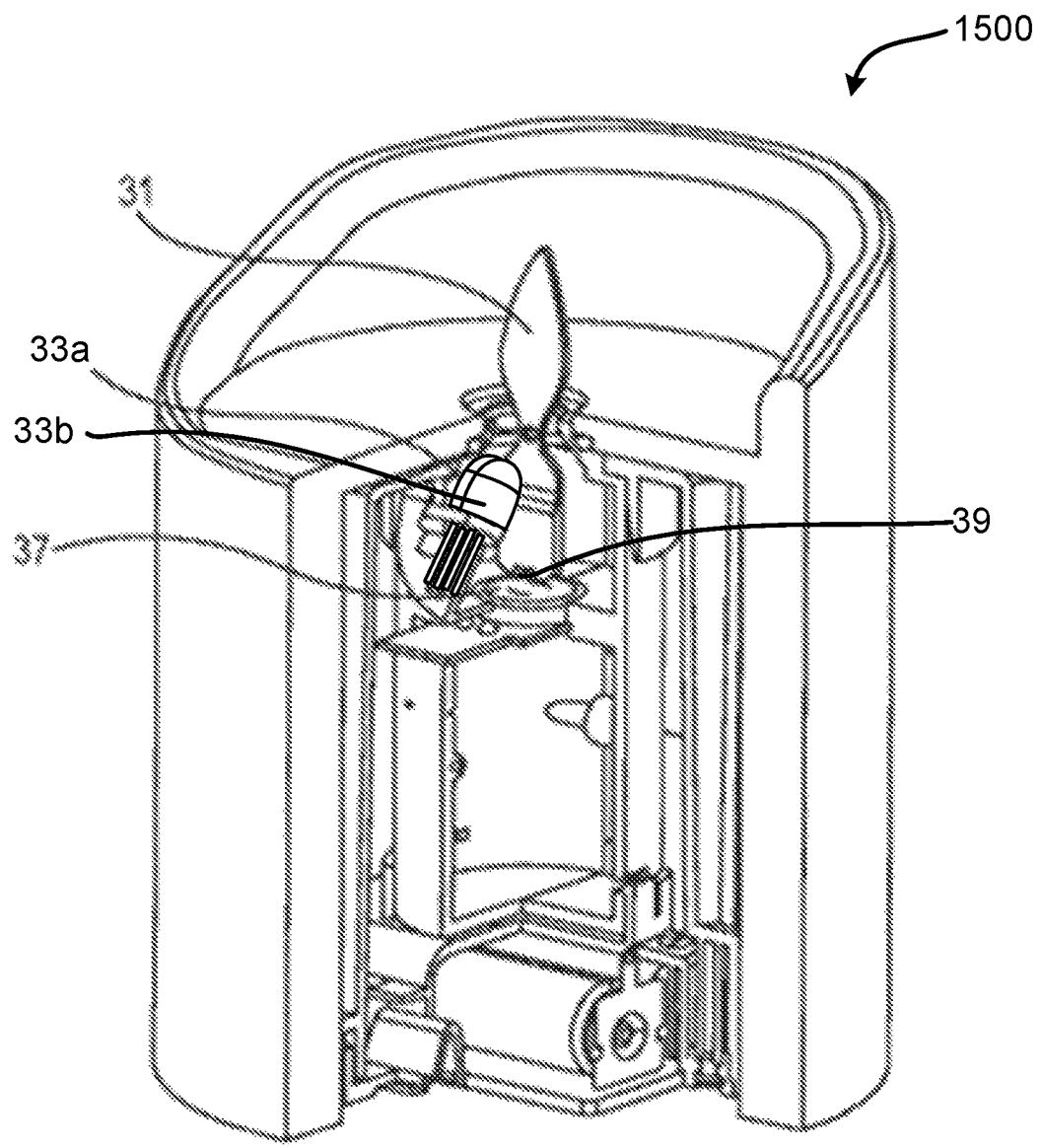
FIG. 15 is a diagram showing a cross-sectional view of an exemplary electronic candle implementing multiple light emitting elements.

FIG. 15 is a diagram showing a cross-sectional view of an exemplary electronic candle 1500 implementing multiple light emitting elements. The electronic candle 1500 is substantially similar to the electronic candle in FIG. 8 that includes a single magnet on the bottom of the flame sheet 31 adjacent to the coil 37 for causing the flame sheet 31 to move in response to an electromagnetic signal generated by the coil. In the electronic candle 1500, multiple light emitting elements 33a and 33b are implemented to further enhance the appearance of a real-life or true flame. Two light emitting elements 33a and 33b are shown in FIG. 15 for illustrative purposes only and the total number of light emitting elements can be more than two. Moreover, multiple light emitting elements can be implemented for any of the electronic candles disclosed in this patent document. Also, while the light emitting elements 33a and 33b are shown in a side-by-side configuration, the light emitting elements 33a and 33b can be disposed in different configurations, such as top-bottom, diagonal or off-centered, geometric patterns, etc.

The coil 37 is controlled by a control circuitry as previously described in this patent document to generate the electromagnetic signal that applies an electromagnetic field on the magnet 39 disposed at the bottom of the flame sheet 31. The applied electromagnetic field causes the flame sheet 31 having the magnet 39 to move. In addition to controlling the coil 37, the control circuit also controls the light emitting elements 33a and 33b. For example, the control circuit can control the light emitting elements 33a and 33b to blink or flash at any desired frequency and duration either in unison or out of phase with each other. In addition, the control circuit can control other properties of the light emitting elements 33a and 33b including dimness, brightness, and color. The control circuit can control any of the properties of the light emitting elements 33a and 33b independent of each other so that the light emitting elements 33a and 33b have the same or different properties at any given time.

Moreover, the control circuit can control the coil 37 and the light emitting elements 33a and 33b so that the movement of the flame sheet 31 and the light emitted onto the flame sheet by the light emitting elements 33a and 33b are choreographed together to further enhance the appearance of a true flame. Specifically, any one or a combination of the properties of the light emitting elements 33a and 33b can be adjusted based on the movement of the flame sheet as caused by the electromagnetic signal generated by the coil. For example, the brightness of the lights can be adjusted based on certain movement of the flame sheet 31 that changes the distance, angle, etc. of the flame sheet 31 with respect to the light emitting elements 33a and 33b. Other properties such as the color or the rate of blinking can be similarly adjusted choreographed with the control of the coil 37 that causes the movement of the flame sheet 31.

In some implementations, the movement of the flame sheet 31 can be choreographed in response to the various properties of the light emitting elements 33a and 33b. For example, certain levels of the brightness of the lights can trigger certain movements of the flame sheet 31 that change the distance, angle, etc. of the flame sheet 31 with respect to the light emitting elements 33a and 33b. Certain levels of other properties such as the color or the rate of blinking can similarly cause corresponding control of the coil 37 that causes the movement of the flame sheet 31.

The choreographed control of the coil 37 and the light emitting elements 33 and 33b by the control circuit can be implemented for any of the electronic candles disclosed in this patent document.

Figure 16:
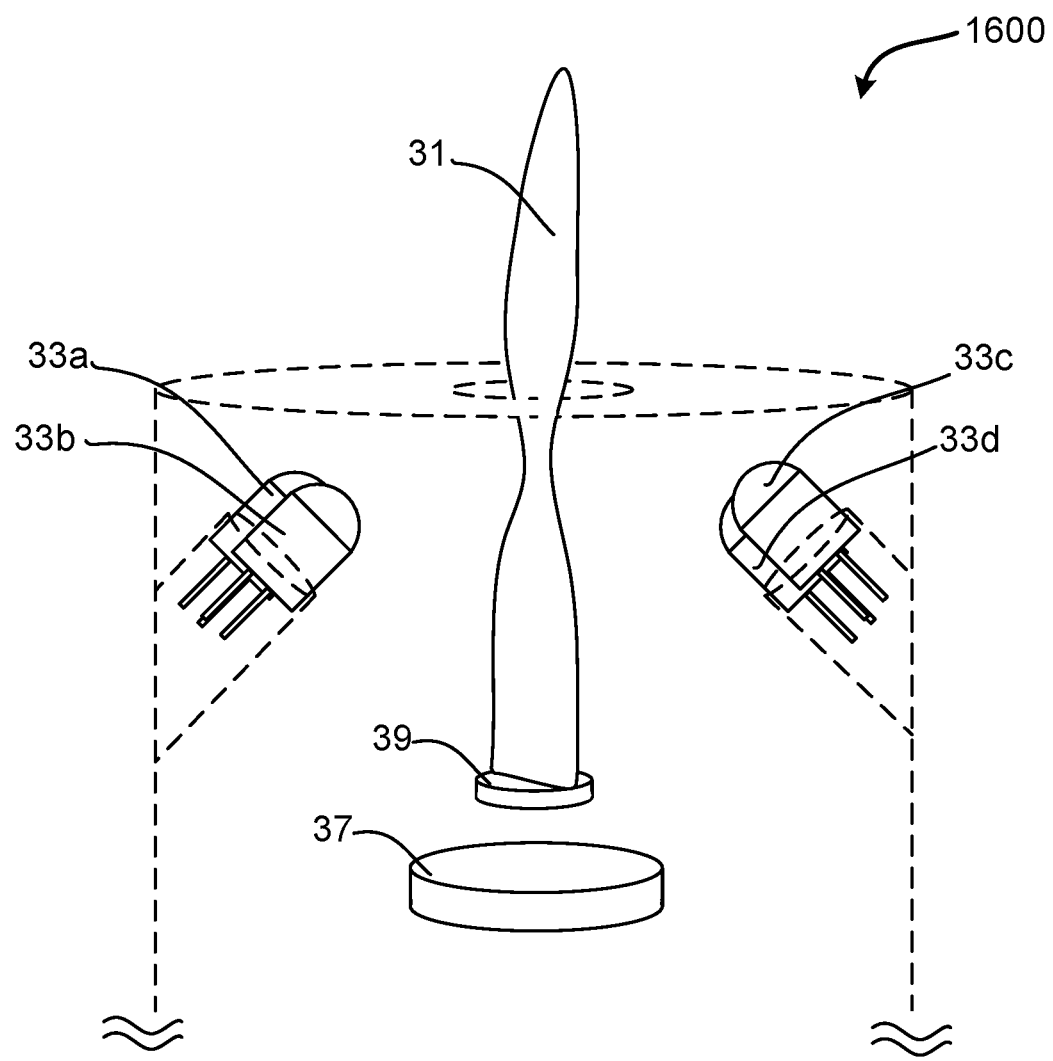
FIG. 16 is a diagram showing an exemplary electronic candle implementing multiple light emitting elements directed to both sides of a flame sheet.

FIG. 16 is a diagram showing an exemplary electronic candle 1600 implementing multiple light emitting elements directed to both sides of a flame sheet. In some implementations, as shown in FIG. 16, multiple light emitting elements can be implemented at different locations within the shell of the electronic candle 1600 so as to provide the appearance of true flame on the flame sheet 31 from multiple angles. Two locations of the light emitting elements 33a, 33b, 33c and 33d are shown in FIG. 16 for illustrative purpose only, and additional light emitting elements can be disposed at additional locations. The added locations of additional light emitting elements can depend on the shape of the flame sheet 31. When a more three-dimensional shape is used for the flame element rather than a sheet so that the total surface area increases from all angles, additional light emitting elements can be implemented at additional locations to provide near 360 degree view of the true flame appearance.

In addition, as described with respect to FIG. 16, the control circuit can choreograph the control of the coil 37 adjacent to the magnet 39 on the flame sheet 31 with the control of the light emitting elements 33a, 33b, 33c, and 33d. Because the movement of the flame sheet 31 will cause the spatial relationship between the flame sheet 31 and each of the different groups of light emitting elements at different locations, the control circuit can adjust the properties of the light emitting elements 33a and 33b at one location different from the light emitting elements 33c and 33d at another location.

Figure 17:
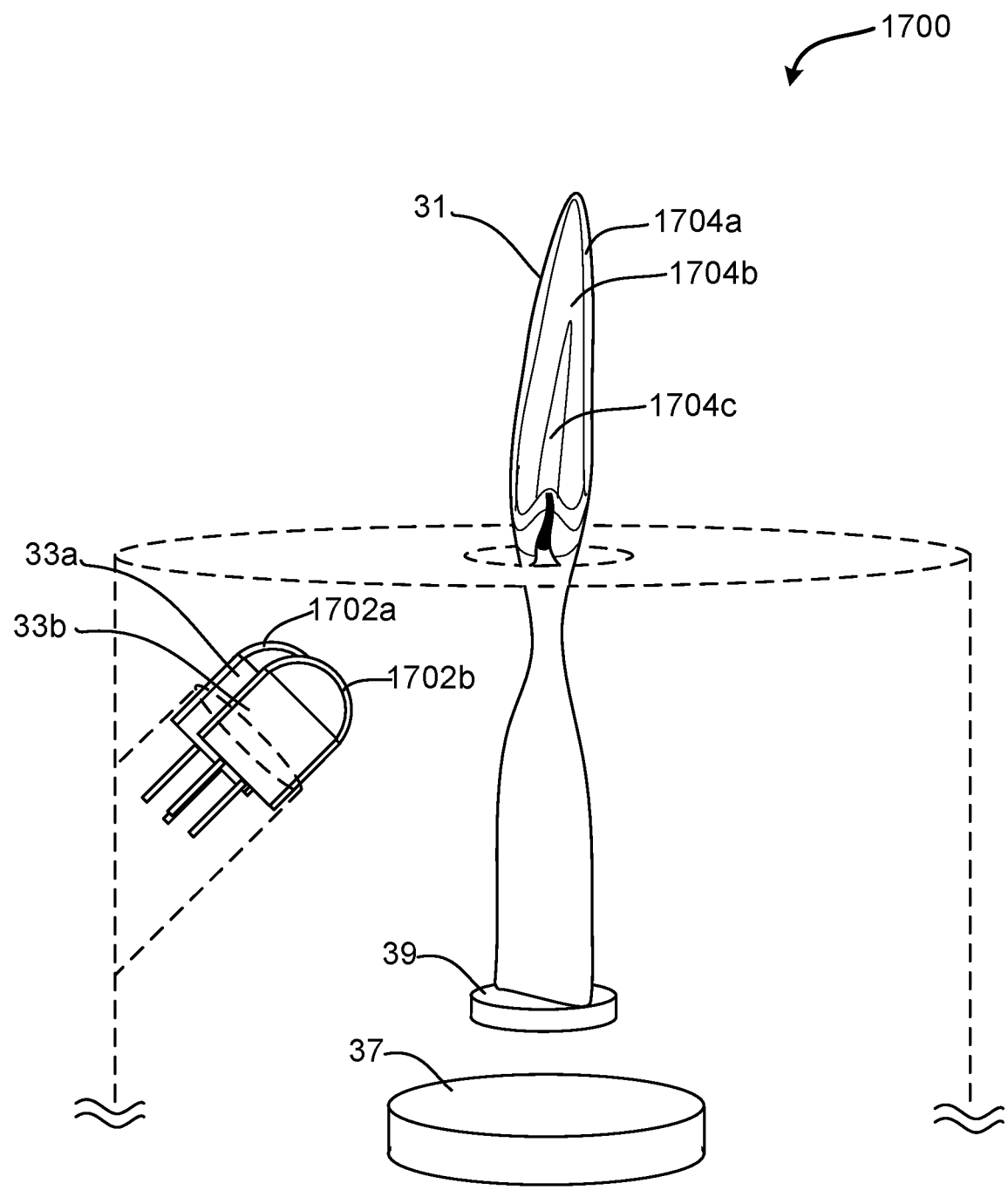
FIG. 17 is a diagram showing an exemplary electronic candle implementing multiple light emitting elements and emitting different color lights.

FIG. 17 is a diagram showing an exemplary electronic candle 1700 implementing multiple light emitting elements and emitting different color lights. The electronic candle 1700 can be implemented different color lights. Different color lights can be achieved through a number of mechanisms. In some implementations, different color LEDs can be implemented for the light emitting elements 33a and 33b. More than two different LEDs can be implemented at different locations (e.g., similar to FIG. 16) and a combination of any number of the total LEDs can be activated together to achieve the desired color light.

In some implementations, multiple colored light emitting elements (e.g., different colored LEDs) can be implemented with each light emitting element of a particular color directed to different portion of the flame sheet to provide multiple layers of color lights on the flame sheet 31. Also, a combination of different or same colored light emitting elements can be directed to emit a desired color light at a desired location of the flame sheet 31. Such targeted light emission on different portions of the flame sheet 31 can be achieved by having the control circuit choreograph the control of the coil 37 adjacent to the magnet 39 and the light emitting elements 33a and 33b.

In some implementations, light converting materials can be applied to the light emitting elements as one or more layers 1702a and 1702b. Similarly, the light converting materials can be applied to the flame sheet 31 in addition to or instead of the light emitting elements. The light converting materials, such as phosphors can convert the light emitted by the light emitting elements to a desired color. By using a combination of the LED light and the light converting material, different color lights can be achieved. Phosphor particles can be mixed with a resin material and the mixture applied as the different light converting layers 1702a and 1702b.

When the light converting material is applied to the flame sheet 31, the light converting material can be applied in a number of different ways. In some implementations, the light converting material as described in the previous paragraphs can be applied only at certain portions of the flame sheet 31. For example, the light converting material can be applied to the edge only, center only, top only, bottom only, or a combination of different portions of the flame sheet 31. For illustrative purposes, different portions or layers 1704a, 1704b, and 1704c are shown on the flame sheet 31. By varying the locations where the light converting material is applied, the flame sheet 31 can have different color, brightness, intensity, blinking, or a combination of these properties of the light emitted to different layers or portions of the flame sheet to further enhance the appearance of a true flame.

Figure 18:
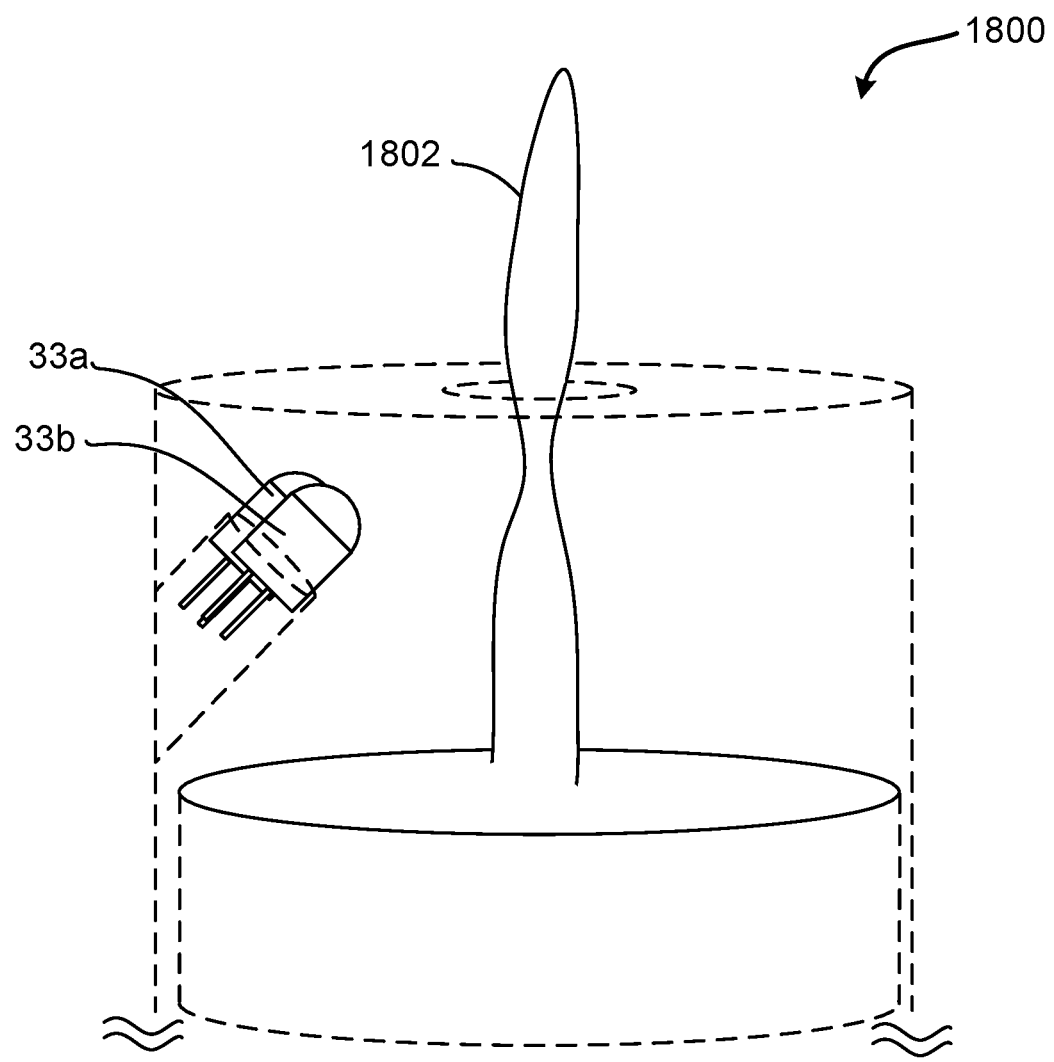
FIG. 18 is a diagram showing an exemplary electronic candle implementing multiple light emitting elements for emitting light onto a non-moving flame sheet.

FIG. 18 is a diagram showing an exemplary electronic candle implementing multiple light emitting elements for emitting light onto a non-moving flame sheet. The electronic candle 1800 in FIG. 18 is substantially similar to the electronic candle 1500 of FIG. 15. However, the movable flame sheet 31 is replaced by a stationary, non-movable flame sheet 1802. In the electronic candle 1800, multiple light emitting elements 33a and 33b are implemented to further enhance the appearance of a real-life or true flame. Two light emitting elements 33a and 33b are shown in FIG. 15 for illustrative purposes only and the total number of light emitting elements can be more than two. Moreover, multiple light emitting elements can be implemented for any of the electronic candles disclosed in this patent document. Also, while the light emitting elements 33a and 33b are shown in a side-by-side configuration, the light emitting elements 33a and 33b can be disposed in different configurations, such as top-bottom, diagonal or off-centered, geometric patterns, etc.

The control circuit can control the light emitting elements 33a and 33b to enhance the appearance of a true flame. For example, the control circuit can control the light emitting elements 33a and 33b to blink or flash at any desired frequency and duration either in unison or out of phase with each other. In addition, the control circuit can control other properties of the light emitting elements 33a and 33b including dimness, brightness, and color. The control circuit can control any of the properties of the light emitting elements 33a and 33b independent of each other so that the light emitting elements 33a and 33b have the same or different properties at any given time.

Figure 19:
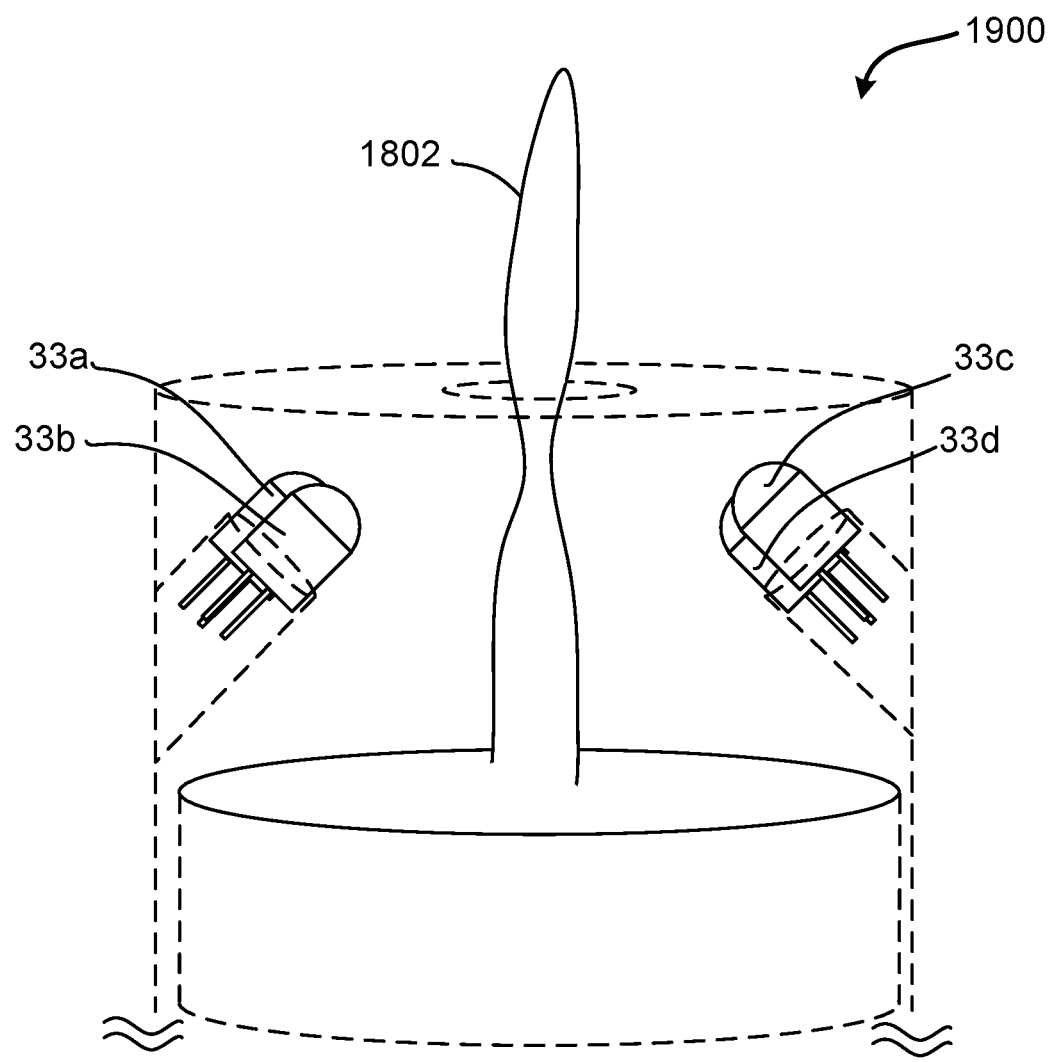
FIG. 19 is a diagram showing an exemplary electronic candle implementing multiple light emitting elements directed to both sides of a non-moving flame sheet.

FIG. 19 is a diagram showing an exemplary electronic candle implementing multiple light emitting elements directed to both sides of a non-moving flame sheet. The electronic candle 1900 in FIG. 19 is substantially similar to the electronic candle 1600 of FIG. 16. However, the movable flame sheet 31 is replaced by a stationary, non-movable flame sheet 1802. In some implementations, as shown in FIG. 19, multiple light emitting elements can be implemented at different locations within the shell of the electronic candle 1900 so as to provide the appearance of true flame on the flame sheet 1802 from multiple angles. Two locations of the light emitting elements 33a, 33b, 33c and 33d are shown in FIG. 19 for illustrative purpose only, and additional light emitting elements can be disposed at additional locations. The added locations of additional light emitting elements can depend on the shape of the flame sheet 1802. When a more three-dimensional shape is used for the flame element rather than a sheet so that the total surface area increases from all angles, additional light emitting elements can be implemented at additional locations to provide near 360 degree view of the true flame appearance.

In addition, the control circuit can adjust the properties of the light emitting elements 33a and 33b at one location different from the light emitting elements 33c and 33d at another location.

Figure 20:
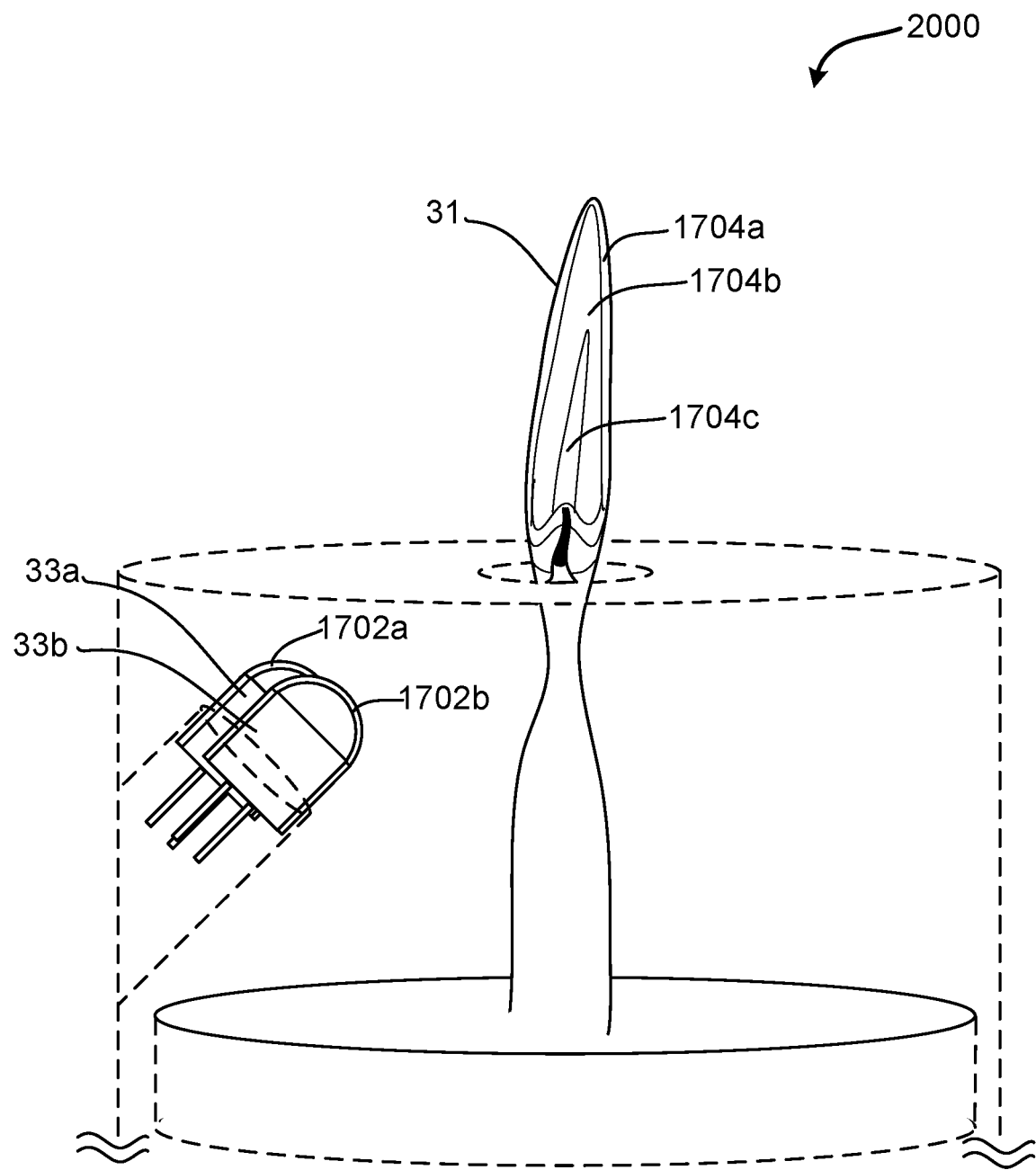
FIG. 20 is a diagram showing an exemplary electronic candle implementing multiple light emitting elements and emitting different color lights for emitting light onto a non-moving flame sheet.

FIG. 20 is a diagram showing an exemplary electronic candle implementing multiple light emitting elements and emitting different color lights for emitting light onto a non-moving flame sheet. The electronic candle 2000 in FIG. 20 is substantially similar to the electronic candle 1700 of FIG. 17. However, the movable flame sheet 31 is replaced by a stationary, non-movable flame sheet 1802.

The electronic candle 1900 can be implemented different color lights. Different color lights can be achieved through a number of mechanisms. In some implementations, different color LEDs can be implemented for the light emitting elements 33a and 33b. More than two different LEDs can be implemented at different locations (e.g., similar to FIG. 17) and a combination of any number of the total LEDs can be activated together to achieve the desired color light.

In some implementations, multiple colored light emitting elements (e.g., different colored LEDs) can be implemented with each light emitting element of a particular color directed to different portion of the flame sheet to provide multiple layers of color lights on the flame sheet 1802. Also, a combination of different or same colored light emitting elements can be directed to emit a desired color light at a desired location of the flame sheet 1802. Such targeted light emission on different portions of the flame sheet 1802 can be achieved by having the control circuit control various properties of the light emitting elements 33a and 33b.

In some implementations, light converting materials can be applied to the light emitting elements as one or more layers 1702a and 1702b. Similarly, the light converting materials can be applied to the flame sheet 1802 in addition to or instead of the light emitting elements. The light converting materials, such as phosphors can convert the light emitted by the light emitting elements to a desired color. By using a combination of the LED light and the light converting material, different color lights can be achieved. Phosphor particles can be mixed with a resin material and the mixture applied as the different light converting layers 1702a and 1702b.

When the light converting material is applied to the flame sheet 1802, the light converting material can be applied in a number of different ways. In some implementations, the light converting material as described in the previous paragraphs can be applied only at certain portions of the flame sheet 1802. For example, the light converting material can be applied to the edge only, center only, top only, bottom only, or a combination of different portions of the flame sheet 1802. For illustrative purposes, different portions or layers 1704a, 1704b, and 1704c are shown on the flame sheet 1802. By varying the locations where the light converting material is applied, the flame sheet 1802 can have different color, brightness, intensity, blinking, or a combination of these properties of the light emitted to different layers or portions of the flame sheet to further enhance the appearance of a true flame.

The present application is further described in detail with reference to above specific embodiments, however, may be carried out by other embodiments than those set forth herein. Those skilled in the art will appreciate that all simple deduces or replacements can also be made without departing from the conception of the application, and are deemed to be embraced in the scope of the present application defined by the appended claims.

What is claimed is:

1. An electronic lighting device, comprising:
an outer shell having a shape to resemble a candle;
a flame-shaped element including a lower portion and an upper portion;
a core positioned inside the outer shell, the core including a top section that comprises a top collar having a through hole, the through hole allowing the upper portion of the flame-shaped element to be exposed above the top section of the core, the top collar formed as a step-like structure including a plurality of steps, each step forming a substantially concentric structure with respect to other step or steps positioned around the through hole, wherein a radial extent of a first step that is positioned closer to the through hole is smaller than a radial extent of a second step that is positioned further away from the through hole compared to the first step;
a support rod positioned to pass through a middle portion of the flame-shaped element between the upper portion and the lower portion, the support rod allowing the flame-shaped element to be movably supported;
a magnetic element coupled to the lower portion of the flame-shaped element, and
a coil that is configured to receive an electric current that energizes the coil to produce a magnetic field that interacts with the magnetic element to induce movements of the flame-shaped element;
one or more light-emitting elements to simulate illumination produced by a candle flame; and
a control circuitry comprising electronic components to control an operation of the one or more light emitting elements.

2. The electronic lighting device of claim 1, wherein the collar is substantially circular in shape and is positioned at a central location of the top section of the core.

3. The electronic light device of claim 1, wherein at least one of the one or more light-emitting elements is positioned within the outer shell.

4. The electronic lighting device of claim 1, wherein the support rod is in contact with the step-like structure and passes through an opening in the middle portion of the flame-shaped element.

5. The electronic lighting device of claim 1, wherein the control circuitry is positioned on a printed circuit board that is electrically connected to the one or more light-emitting elements, and wherein the control circuitry is configured to cause the one more light-emitting elements to blink to signal an operational state of the electronic lighting device.

6. The electronic lighting device of claim 1, wherein at least one of the light-emitting elements is oriented at an inclined angle with respect to the flame-shaped element and positioned through one or more notches formed on a sidewall of the core to project light onto the upper portion of the flame-shaped element.

7. The electronic lighting device of claim 1, wherein the coil is positioned below the through hole, underneath the lower portion of the flame-shaped element, and is substantially centered along an axis that passes through a center of the through hole.

8. The electronic lighting device of claim 1, wherein at least a portion of the flame-shaped element is formed as a sheet to allow light emitted from the one or more light-emitting elements to be projected onto a surface of the flame-shaped element.

9. The electronic lighting device of claim 1, wherein the support rod includes a depression at a middle section thereof.

10. The electronic lighting device of claim 1, wherein the core includes two halves that are connected together to form a substantially cylindrical enclosure.

11. The electronic lighting device of claim 1, wherein the upper portion of the flame-shaped element is formed from a semitransparent material to allow a portion of light to seep therethrough.

12. The electronic lighting device of claim 1, wherein the outer shell includes a through hole that is aligned with the through hole of the collar, and the upper portion of the flame-shaped element protrudes upward through the through hole of the outer shell.

13. The electronic lighting device of claim 1, wherein at least one of the one or more light-emitting elements is configured to produce a beam profile that projects a generally elliptical light pattern towards the upper portion of the flame-shaped element.

14. The electronic lighting device of claim 1, wherein the control circuitry is configured to produce a time varying output signal to energize the one or more light-emitting elements.

15. The electronic lighting device of claim 1, wherein the flame-shaped element comprises a wire embedded therein that is visible through a material of the flame-shaped element to resemble a candle wick.

16. The electronic lighting device of claim 1, wherein the outer shell is semi-transparent and is at least partially comprises wax.

17. The electronic lighting device of claim 1, wherein the outer shell includes an irregularly-shaped top section to resemble a melted top of a real candle.

18. The electronic lighting device of claim 1, wherein the one or more light-emitting elements are operable to emit a blinking light onto the upper portion of the flame-shaped element to create a flickering effect of a candle flame.

19. The electronic lighting device of claim 1, further comprising a battery compartment positioned within a lower half of the cavity formed by the outer shell to include one or more batteries and to electrically connect the one or more batteries with the control circuitry to supply electrical power to the control circuitry.

20. The electronic lighting device of claim 1, further comprising a casing, wherein the outer shell is positioned over at least a section of the casing.

21. The electronic lighting device of claim 1, wherein the step-like structure includes three steps.

22. An electronic lighting device, comprising:
an outer shell having a shape to resemble a candle and having a top hole;
a flame-shaped element including a lower portion and an upper portion;
a core positioned inside the outer shell, the core including a top section that comprises a top collar having a through hole, the through hole allowing the upper portion of the flame-shaped element to be exposed above the top section of the core, the top collar formed as a step-like structure including a plurality of steps, each step forming a substantially concentric structure with respect to other step or steps positioned around the through hole, wherein a radial extent of a first step that is positioned closer to the through hole is smaller than a radial extent of a second step that is positioned further away from the through hole compared to the first step;
an elongated support that spans across an opening of the core to allow suspension of the flame-shaped element, the elongated support including a depression at a middle section thereof to allow the flame-shaped element to be movably supported thereon;
a magnet coupled to the lower portion of the flame-shaped element;
a coil that is configured to receive an electric current that energizes the coil to produce a magnetic field that interacts with the magnet to induce movements of the flame-shaped element; and
one or more light-emitting elements to simulate illumination produced by a candle flame, wherein:
the collar is substantially circular in shape and is positioned at a central location of the top section of the core, and
the coil is positioned below the through hole, underneath the lower portion of the flame-shaped element, and is substantially centered along an axis that passes through a center of the through hole and the top hole of the outer shell.

23. The electronic lighting device of claim 22, further comprising electrical circuitry to produce a time varying output signal to energize the one or more light-emitting elements and to produce the electric current that energizes the coil.

24. The electronic lighting device of claim 22, further comprising a timer switch to allow the electronic lighting device to turn on for a particular period of time in a 24-hour cycle.

25. The electronic lighting device of claim 22, wherein at least one of the light-emitting elements is oriented at an inclined angle with respect to the flame-shaped element and positioned through one or more notches formed on a sidewall of the core to project light onto the upper portion of the flame-shaped element.

26. The electronic lighting device of claim 22, further comprising a casing that is sleeved through the outer shell.

27. The electronic light device of claim 22, wherein the step-like structure consists of three steps.

28. An electronic lighting device for simulating a candle, comprising:
an outer shell having a shape to resemble a candle;
a flame-shaped element including a lower portion and an upper portion;
a core positioned inside the outer shell, the core including a top section that comprises a top collar having a through hole, the through hole allowing the upper portion of the flame-shaped element to be exposed above the top section of the core, the top collar formed as a step-like structure including a plurality of steps, each step forming a substantially concentric structure with respect to other step or steps positioned around the through hole, wherein a radial extent of a first step that is positioned closer to the through hole is smaller than a radial extent of a second step that is positioned further away from the through hole compared to the first step;
a casing that is cylindrical in shape, wherein the outer shell is positioned over at least a section of the casing;
means for supporting the flame-shaped element across the through hole;
a first magnetic mechanism for magnetizing the lower portion of the flame-shaped element, and a second magnetic mechanism positioned below the first magnetic mechanism for imparting movements to the flame-shaped element through interactions with the first magnetic mechanism;
illumination means for illuminating the flame-shaped element; and
control means for controlling illumination produced by the illumination means, wherein:
the collar is positioned at a central location of the top section of the core, and
the second magnetic mechanism is positioned vertically below the first magnetic mechanism.

29. The electronic lighting device of claim 28, wherein the casing includes a top hole that is centrally aligned with the through hole.

* * * * *